United States Patent
Park et al.

(10) Patent No.: US 12,302,213 B2
(45) Date of Patent: May 13, 2025

(54) SHARED AP SELECTION IN MULTI-AP SYSTEM

(71) Applicant: LG ELECTRONICS INC., Seoul (KR)

(72) Inventors: Sungjin Park, Seoul (KR); Jeongki Kim, Seoul (KR); Jinsoo Choi, Seoul (KR); Suhwook Kim, Seoul (KR); Taewon Song, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 17/754,746

(22) PCT Filed: Sep. 9, 2020

(86) PCT No.: PCT/KR2020/012138
§ 371 (c)(1),
(2) Date: Apr. 11, 2022

(87) PCT Pub. No.: WO2021/075725
PCT Pub. Date: Apr. 22, 2021

(65) Prior Publication Data
US 2023/0328622 A1    Oct. 12, 2023

(30) Foreign Application Priority Data

Oct. 17, 2019  (KR) .................. 10-2019-0129454
Oct. 17, 2019  (KR) .................. 10-2019-0129456

(Continued)

(51) Int. Cl.
*H04W 40/12*  (2009.01)

(52) U.S. Cl.
CPC .................. *H04W 40/12* (2013.01)

(58) Field of Classification Search
CPC .................................... H04W 40/12
(Continued)

(56) References Cited

U.S. PATENT DOCUMENTS 11,984,973 B2 *  5/2024  Kim .................. H04L 1/0013
12,171,034 B2 * 12/2024  Kim .................. H04L 5/0055
(Continued)

FOREIGN PATENT DOCUMENTS

| EP | 4354968 A2 * | 4/2024 | ............ H04W 16/14 |
| WO | 2018-160994 | 9/2018 | |
| WO | 2018-231734 | 12/2018 | |

OTHER PUBLICATIONS

PCT International Application No. PCT/KR2020/012138, International Search Report dated Dec. 3, 2020, 4 pages.
(Continued)

*Primary Examiner* — Peter G Solinsky
(74) *Attorney, Agent, or Firm* — LEE, HONG, DEGERMAN, KANG & WAIMEY

(57) ABSTRACT

In a wireless local area network (LAN) system, a sharing access point (AP): receives, from a first AP, basic service set (BSS) information of the first AP; receives, from a second AP, BSS information of the second AP; receives, from a station (STA), a link report signal including link quality information about the link between the first AP and the STA and link quality information about the link between the second AP and the STA; and selects the first AP as a shared AP on the basis of first and second capability information and the link quality information.

12 Claims, 47 Drawing Sheets

(30) Foreign Application Priority Data

Oct. 17, 2019 (KR) .......................... 10-2019-0129458
Nov. 18, 2019 (KR) .......................... 10-2019-0148064

(58) Field of Classification Search
USPC .......................................................... 370/328
See application file for complete search history.

(56) References Cited

U.S. PATENT DOCUMENTS

| | | |
|---|---|---|
| 2018/0279130 A1 | 9/2018 | Huang et al. |
| 2021/0022156 A1* | 1/2021 | Bhanage ............. H04W 72/535 |
| 2021/0273757 A1* | 9/2021 | Shellhammer ........ H04L 5/0044 |

OTHER PUBLICATIONS

Tanaka et al., "Discussion on Multi-AP Coordination Type," IEEE 802.11-19/0104r1, Jan. 2019, 14 pages.
Linan et al., "Consideration on Multi-AP Coordination," IEEE 802.11-19/1129r2, Sep. 2019, 11 pages.

* cited by examiner

FIG. 1
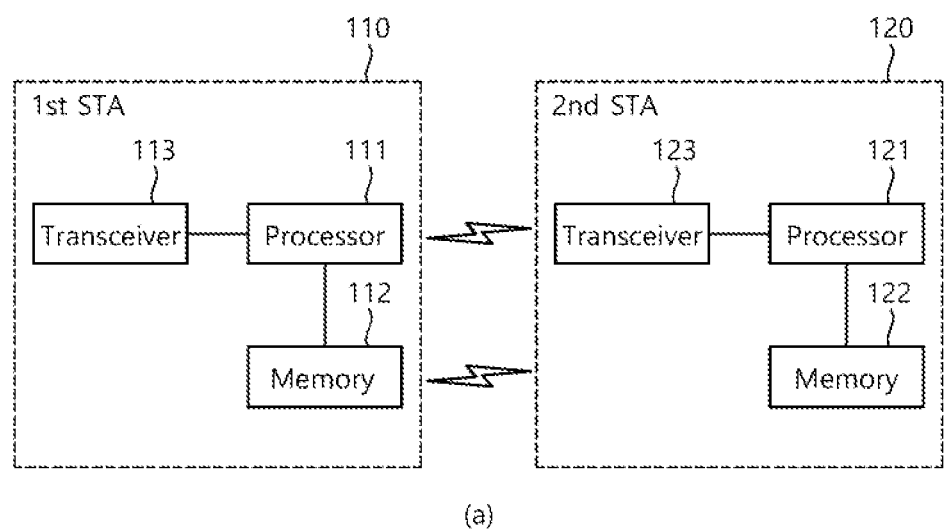
(a)
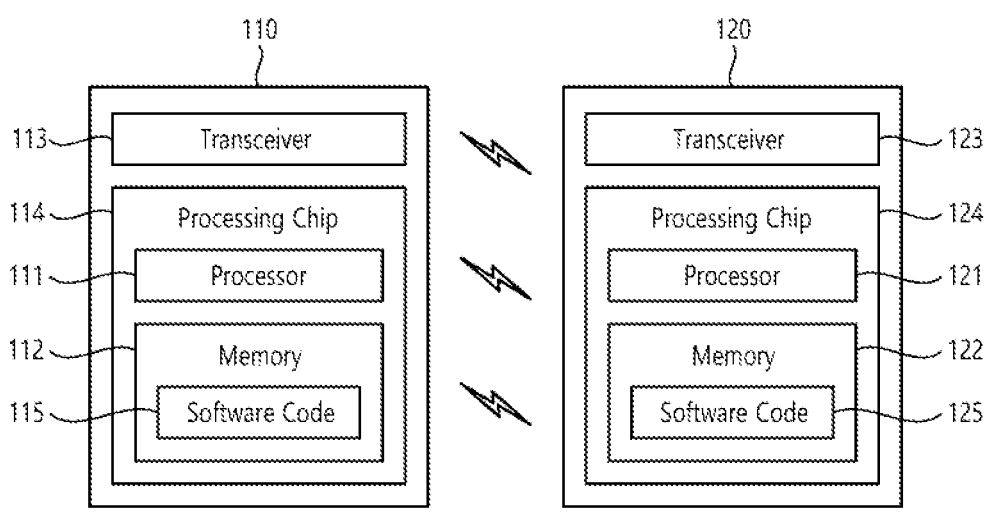
(b)

FIG. 2
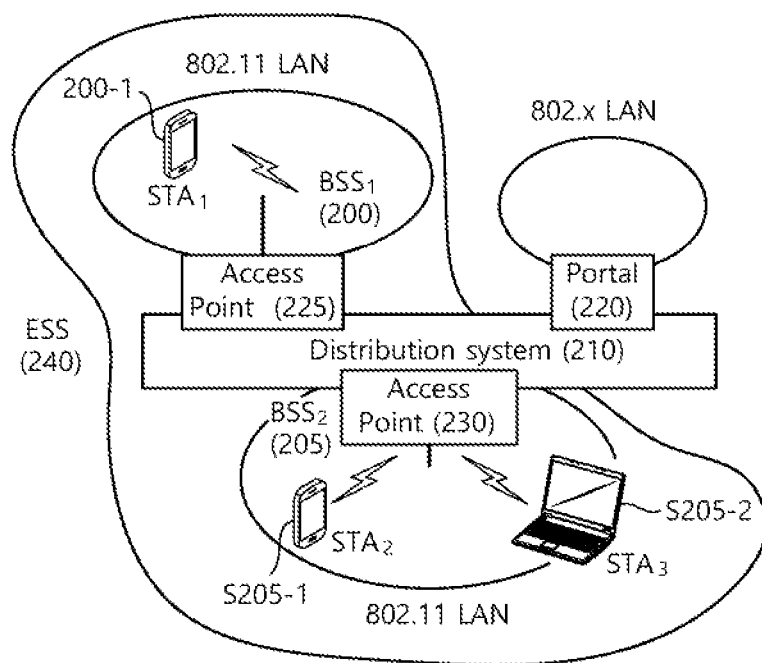
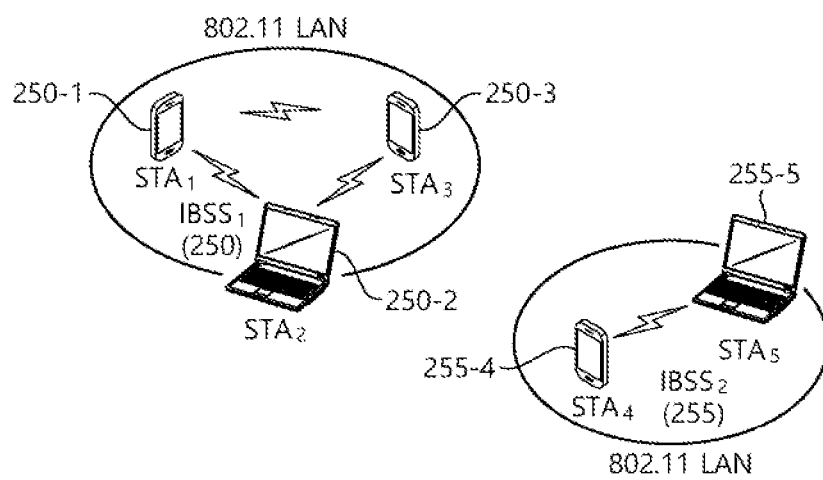

FIG. 18

| 8μs | 8μs | 4μs | 4μs | | | | | |
|---|---|---|---|---|---|---|---|---|
| L-LTF | L-STF | L-SIG | RL-SIG | SIG A | SIG B | STF | LTF | Data | PE |

FIG. 39
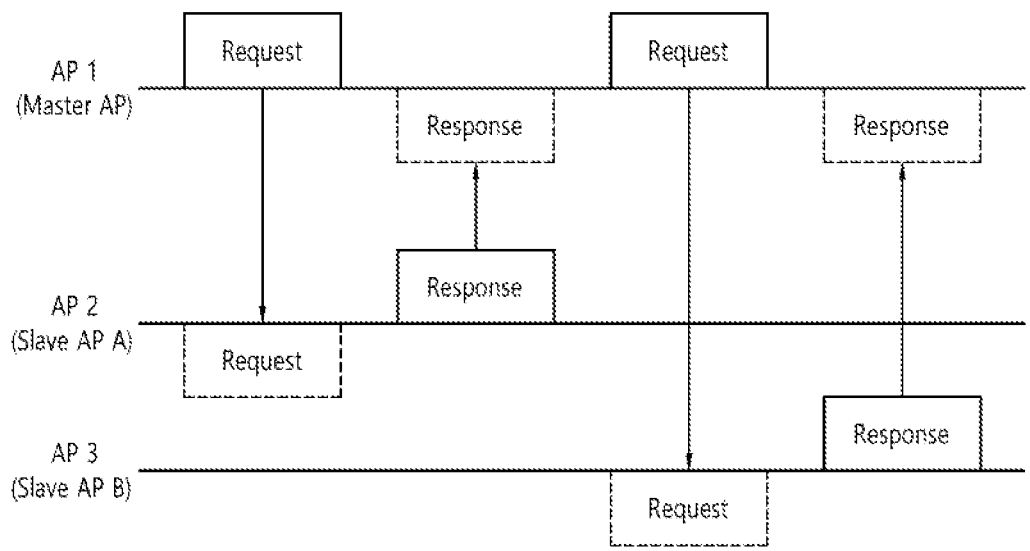
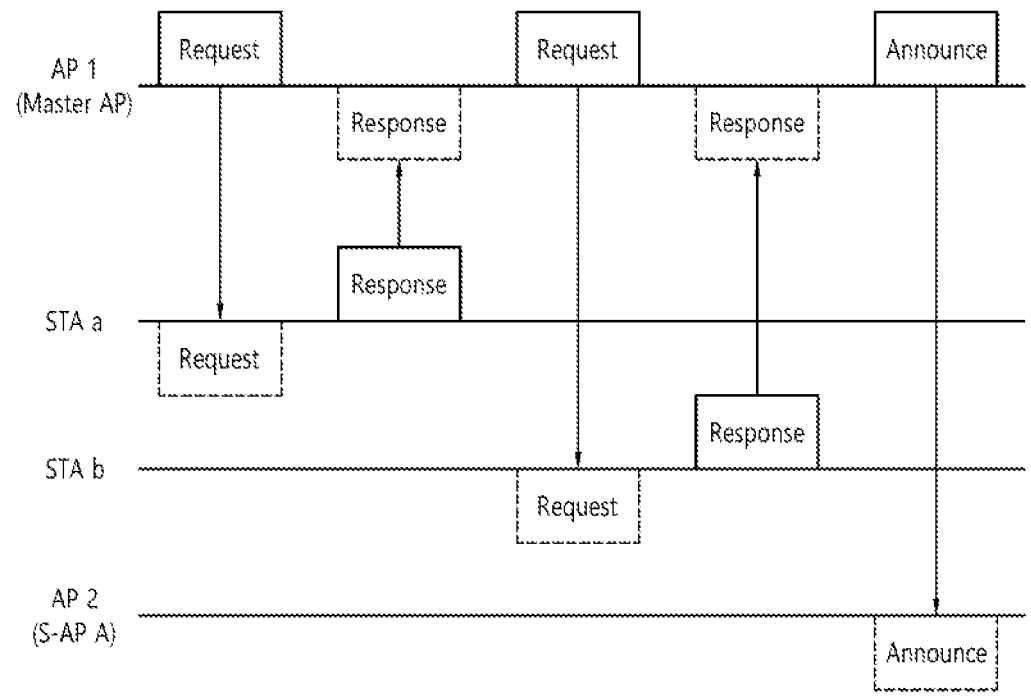

FIG. 40
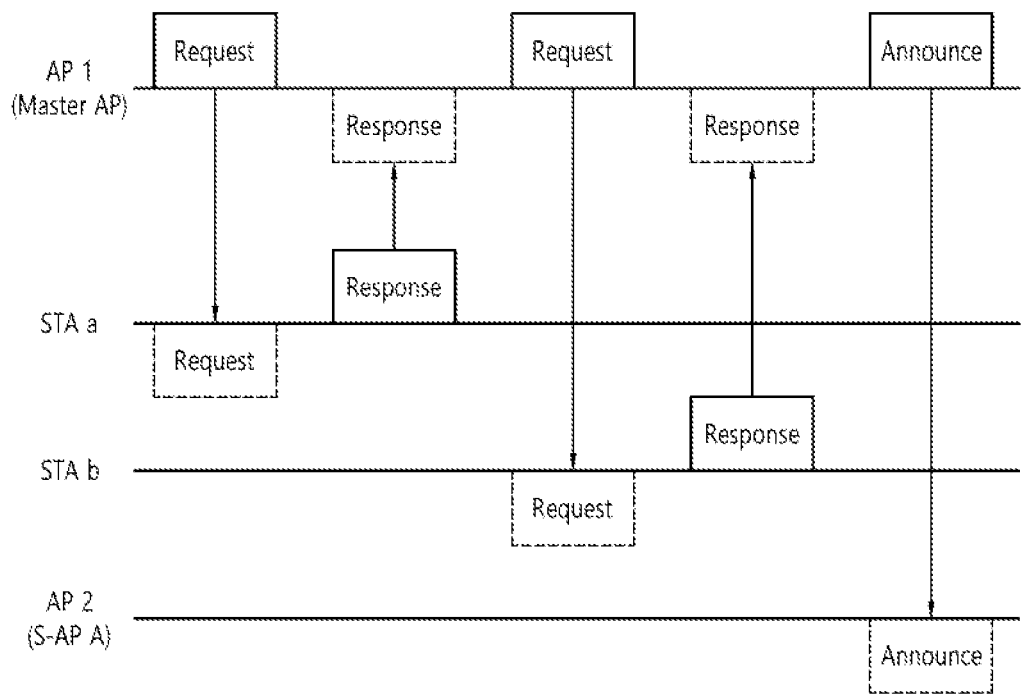
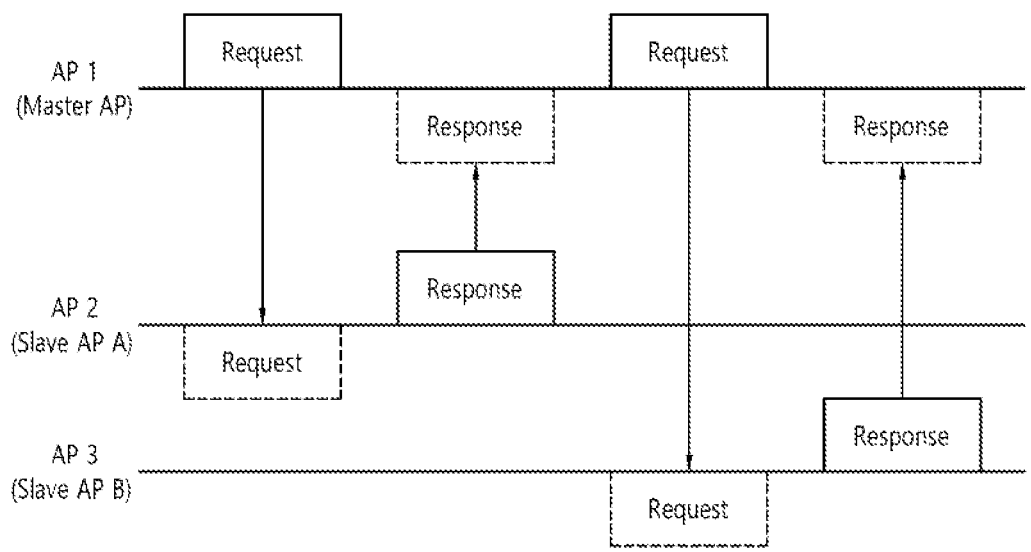

SHARED AP SELECTION IN MULTI-AP SYSTEM

CROSS-REFERENCE TO RELATED APPLICATIONS

This application is the National Stage filing under 35 U.S.C. 371 of International Application No. PCT/KR2020/012138, filed on Sep. 9, 2020, which claims the benefit of earlier filing date and right of priority to Korean Application Nos. 10-2019-0129454, filed on Oct. 17, 2019, 10-2019-0129456 filed on Oct. 17, 2019, 10-2019-0129458 filed on Oct. 17, 2019 and 10-2019-0148064, filed on Nov. 18, 2019, the contents of which are all hereby incorporated by reference herein in their entireties.

BACKGROUND OF THE DISCLOSURE

Field of the Disclosure

The present specification relates to a method of selecting a shared AP for multi-AP transmission in a wireless local area network (WLAN) system including a plurality of access points (APs).

Related Art

Wireless network technologies may include various types of wireless local area networks (WLANs). The WLAN employs widely used networking protocols and can be used to interconnect nearby devices together. The various technical features described herein may be applied to any communication standard, such as WiFi or, more generally, any one of the IEEE 802.11 family of wireless protocols. A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Solutions

A method performed by a station (STA) in a wireless local area network system according to various embodiments of the present disclosure may include technical features for performing multi-AP transmission. A sharing AP may receive, from a first AP, basic service set (BSS) information of the first AP, and receive, from a second AP, BSS information of the second AP. A sharing AP may receive from a station (STA), a link report signal including link quality information between the first AP and the STA and link quality information between the second AP and the STA. A sharing AP may select the first AP as a shared AP based on the first and second capability information and the link quality information.

Technical Effects

According to an embodiment of the present specification, the sharing AP may select the shared AP based on the BSS information received from the neighboring AP and the link quality information received from the STA. Therefore, it is possible to select an optimal shared AP in consideration of both the STA and AP positions.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 18 illustrates an example of a PPDU used in the present specification.

FIG. 39 is a diagram illustrating an embodiment of a method for a master AP to select an SAP.

FIG. 40 is a diagram illustrating an embodiment of a method for a Master AP to select an SAP.

DETAILED DESCRIPTION

Figure 3:
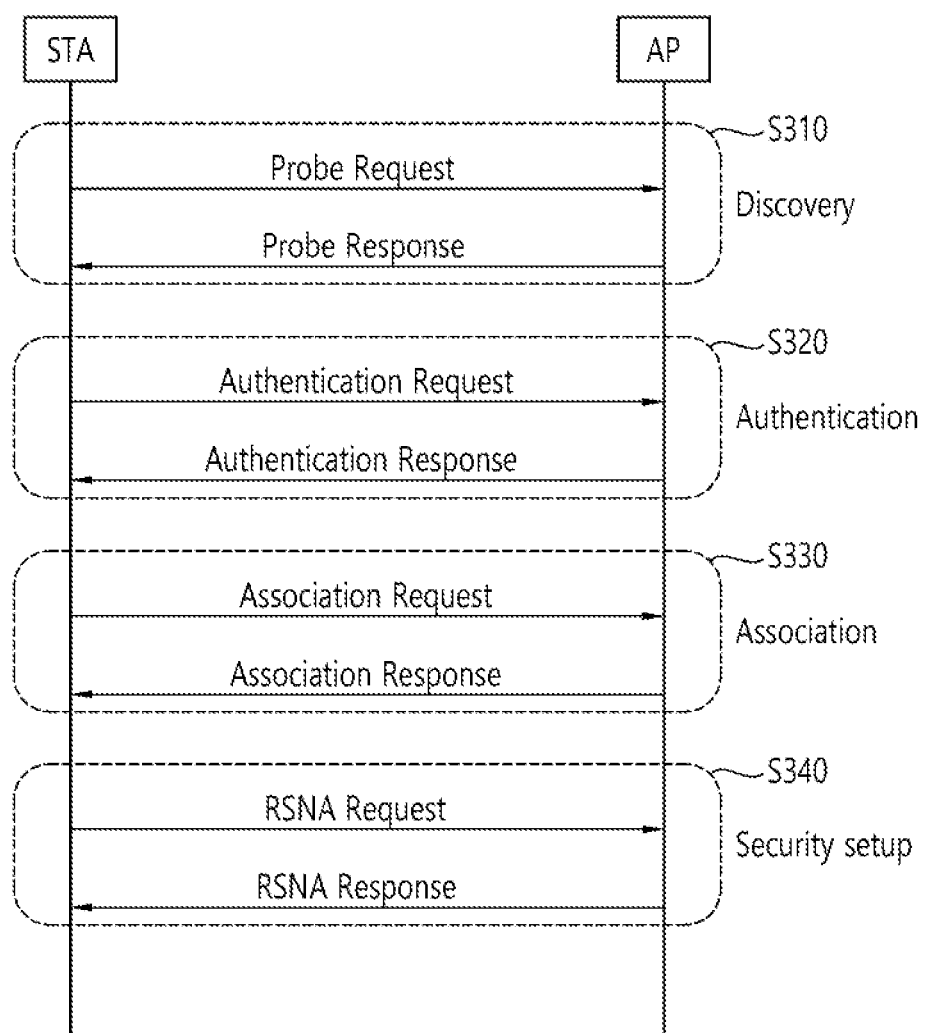
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
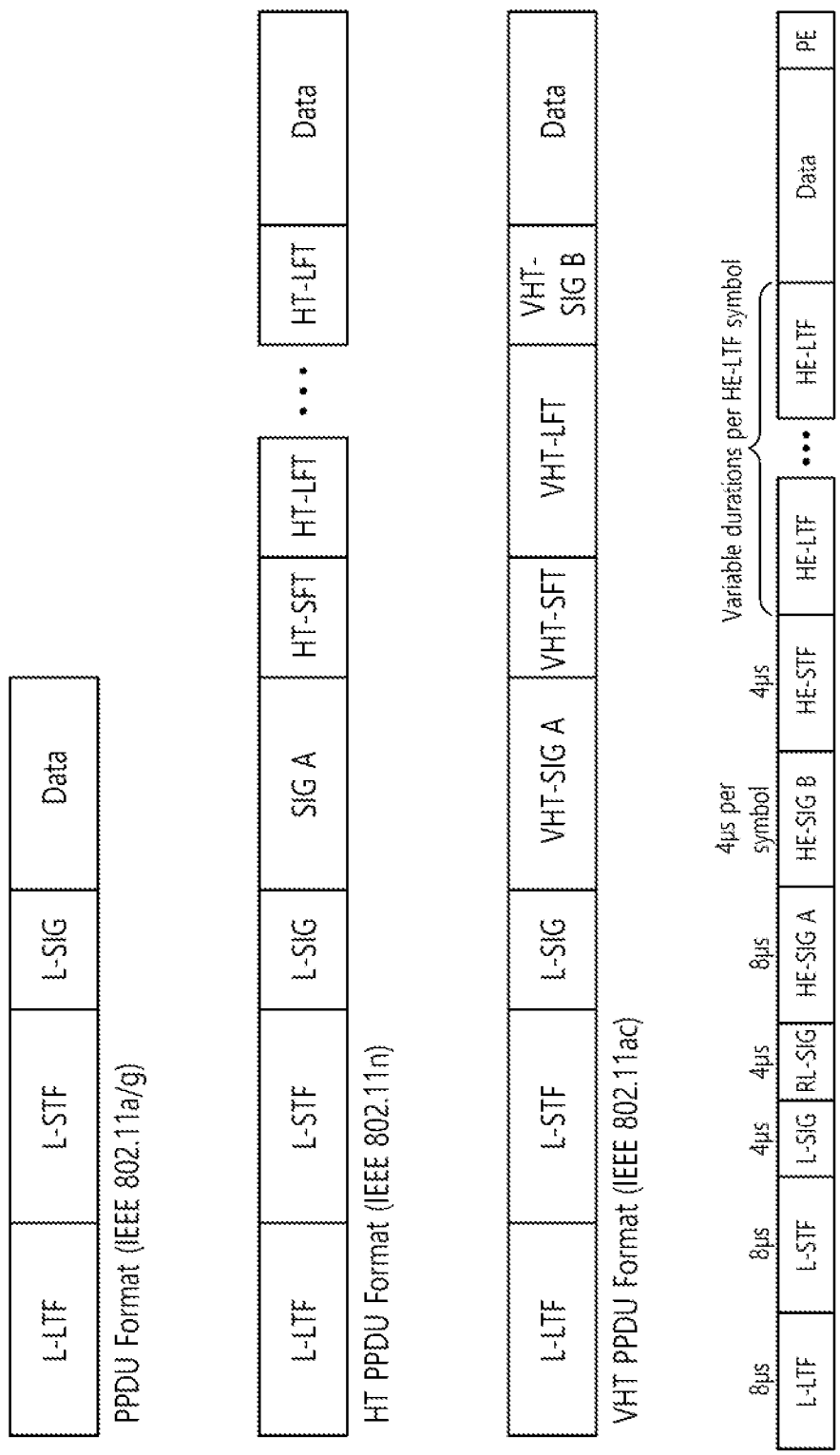
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
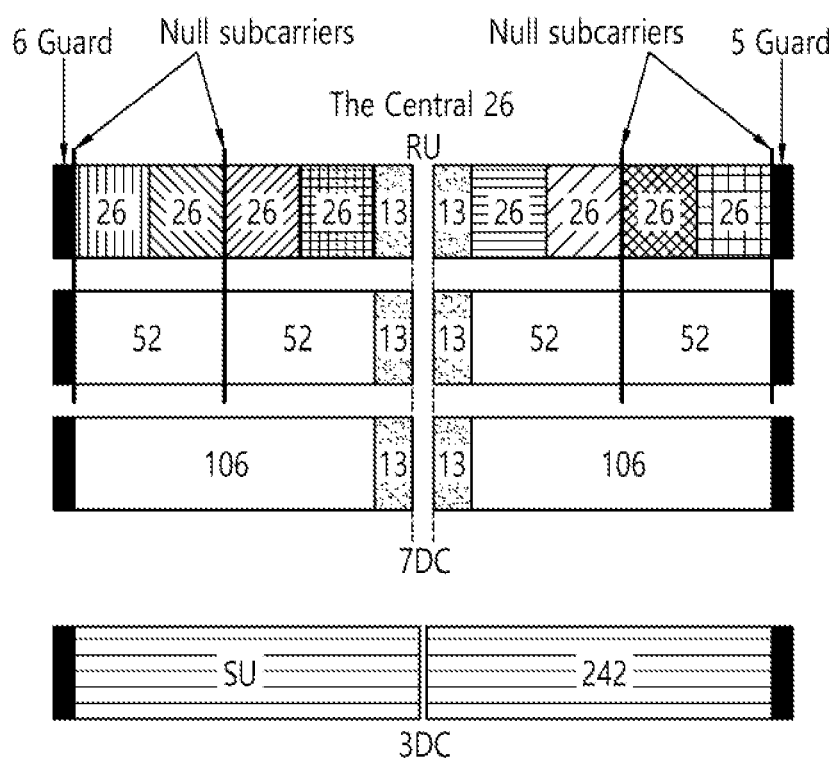
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
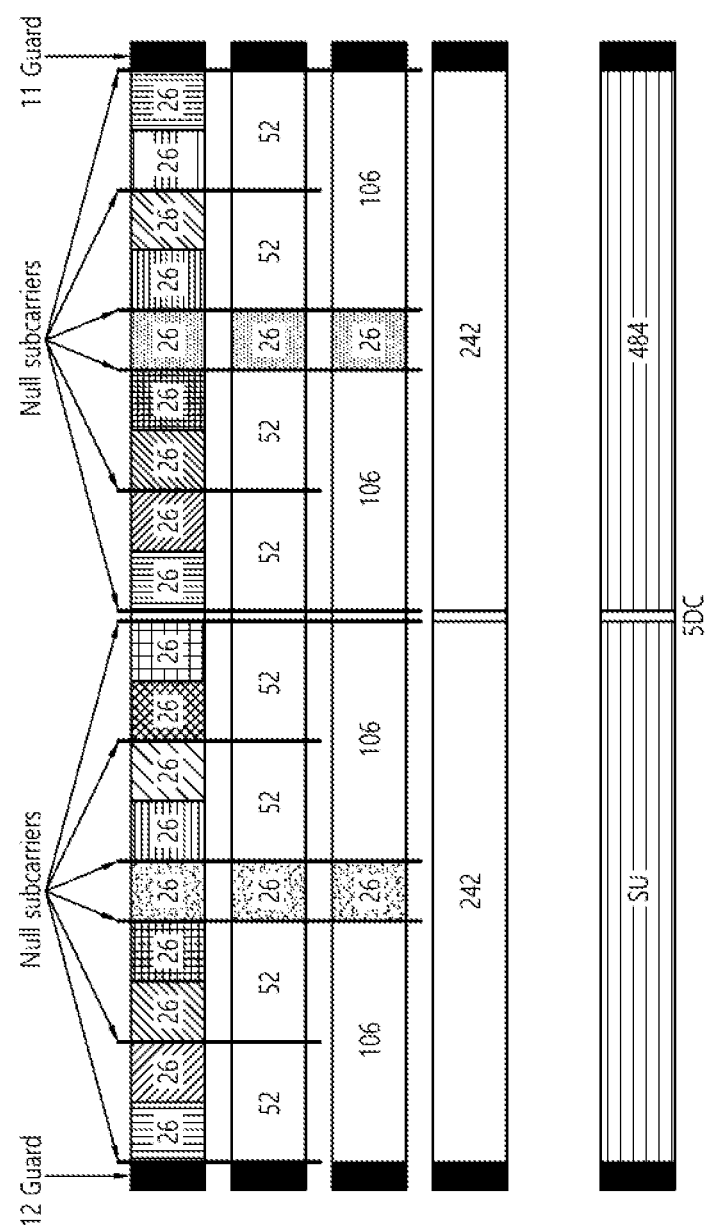
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40

MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
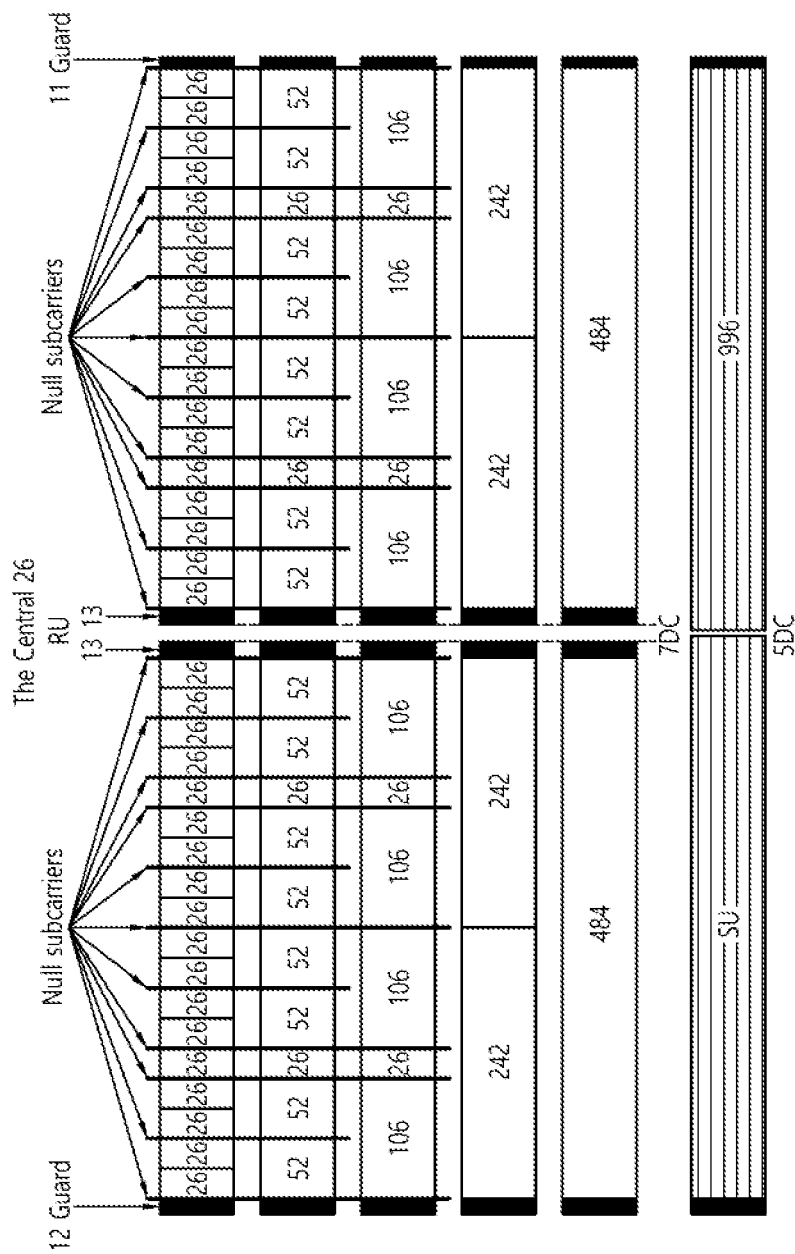
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
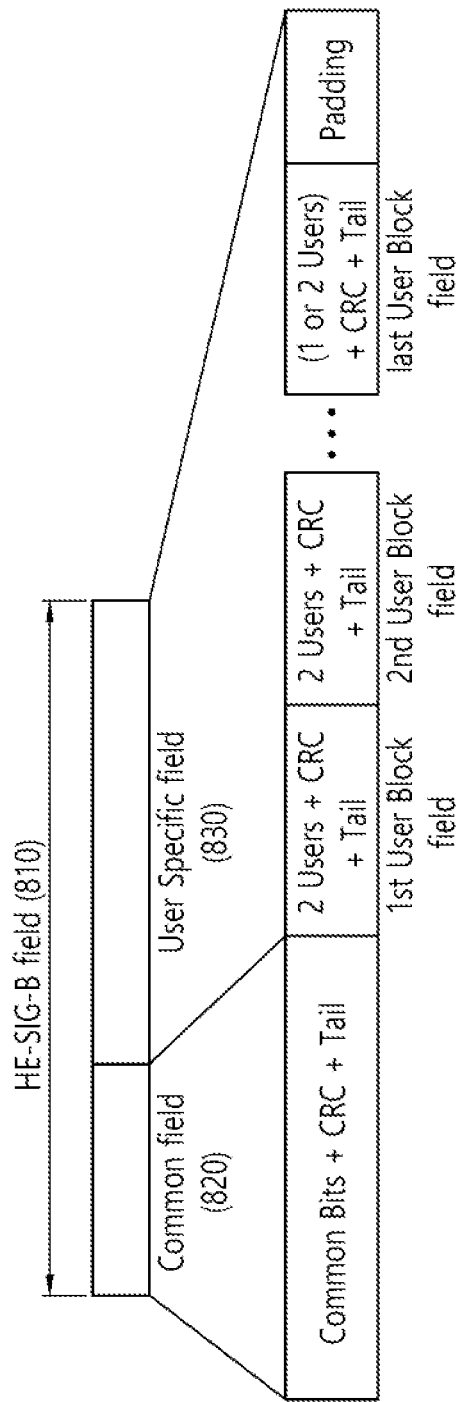
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | 26 | 26 | 26 | 26 | 26 | | 8 |
| 01001$y_2y_1y_0$ | | 106 | | 26 | 26 | 26 | 52 | | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
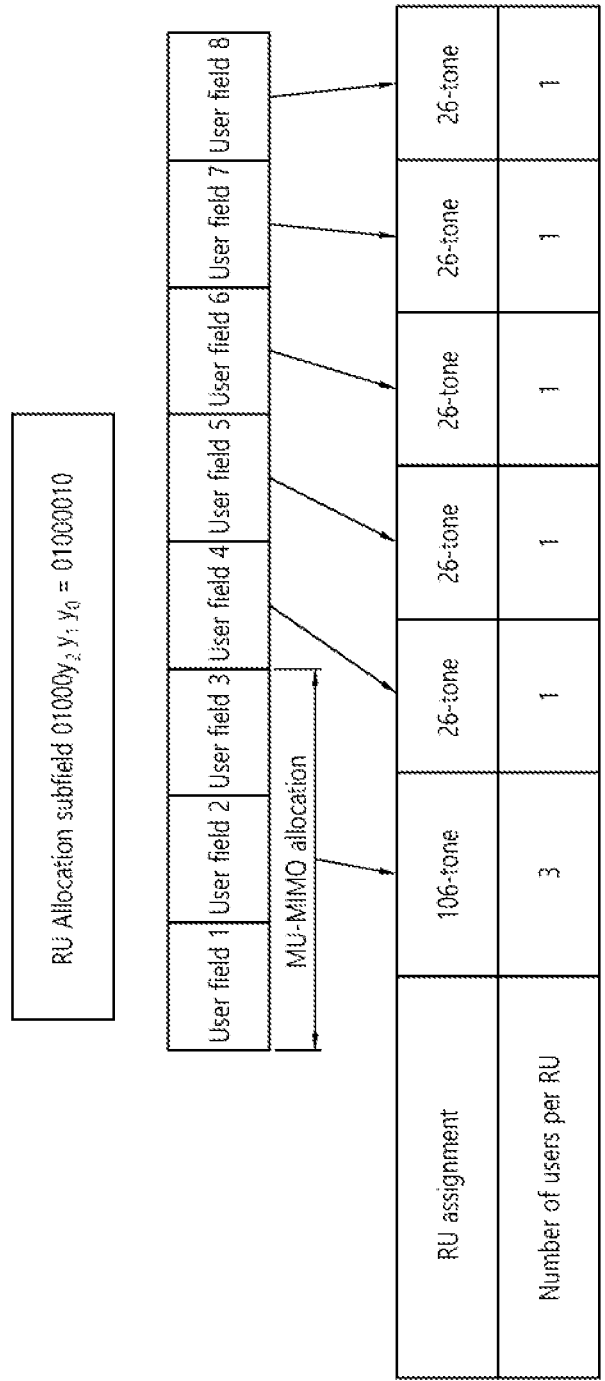
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 … B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 … B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
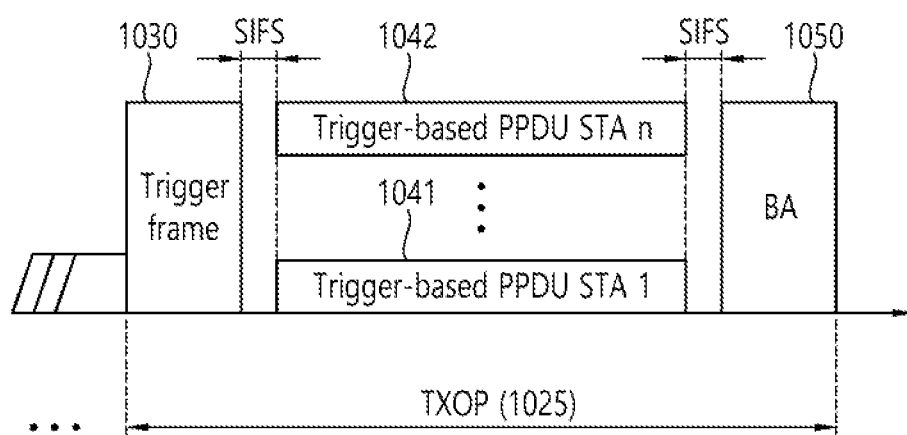
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
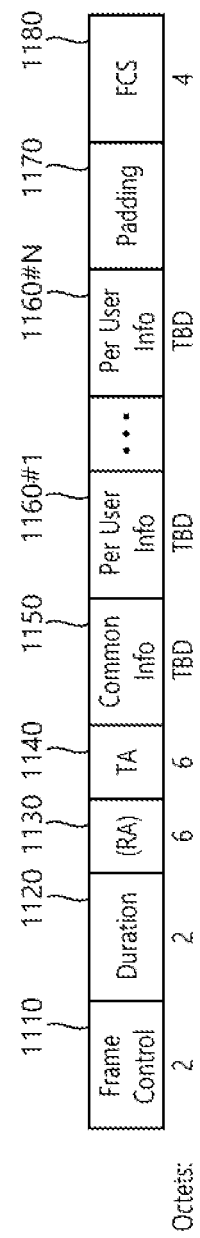
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
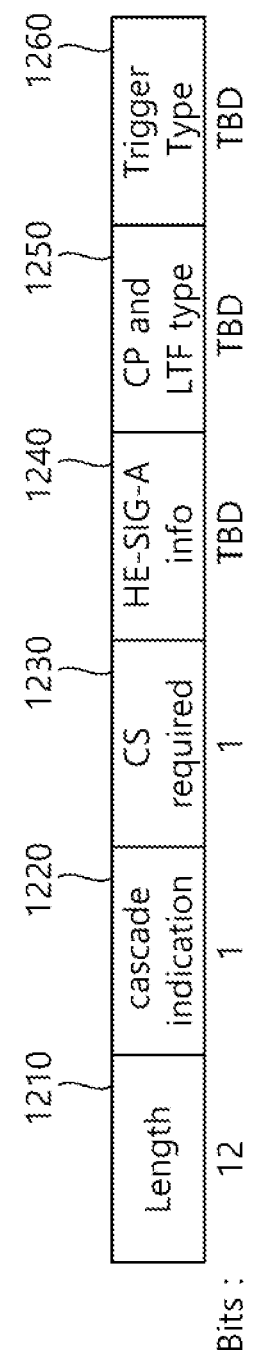
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
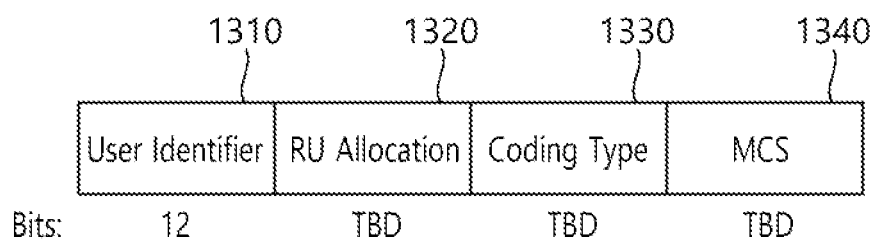
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
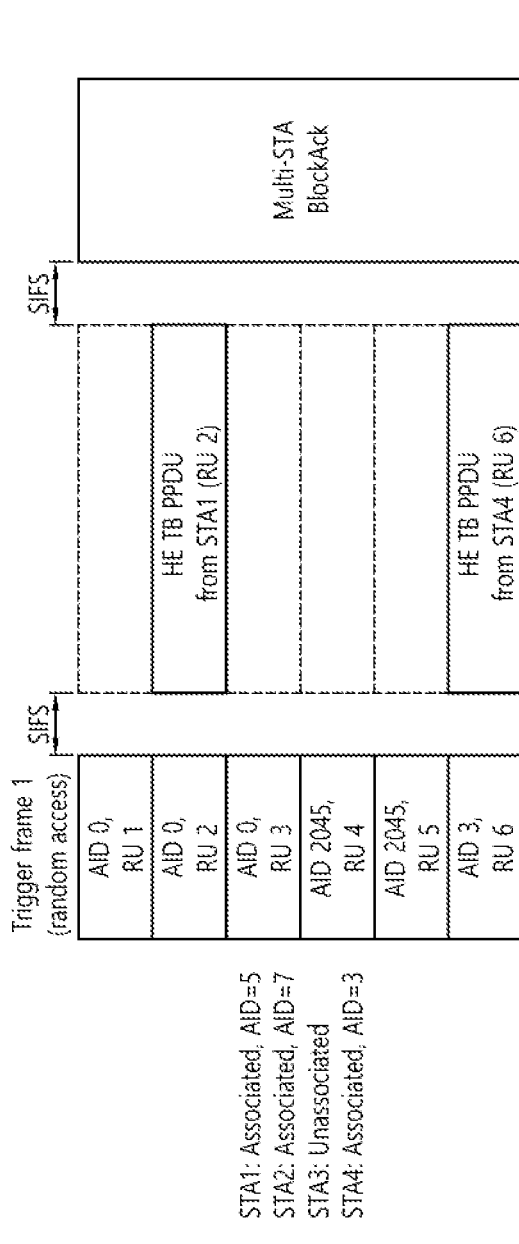
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
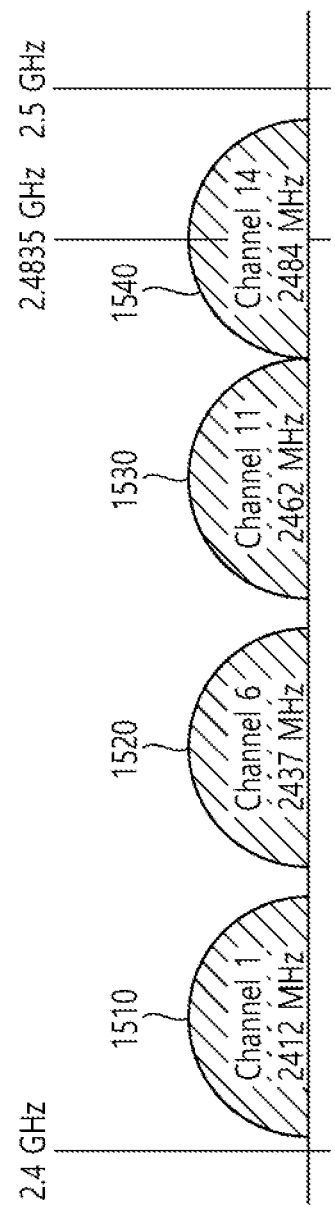
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
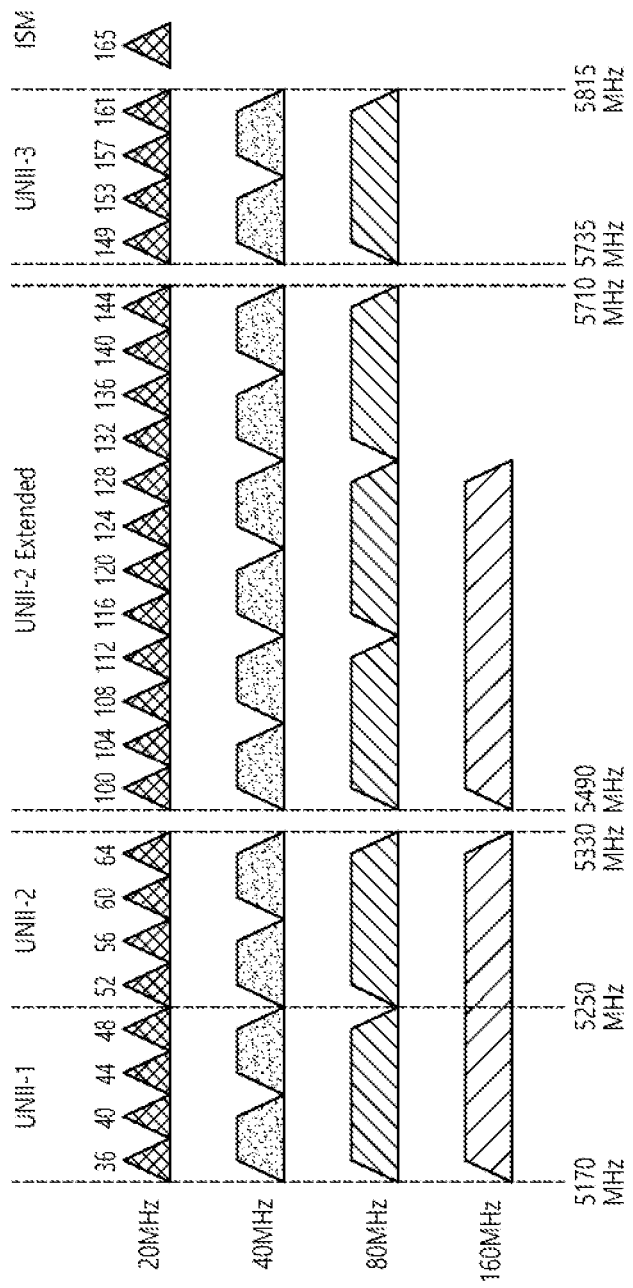
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
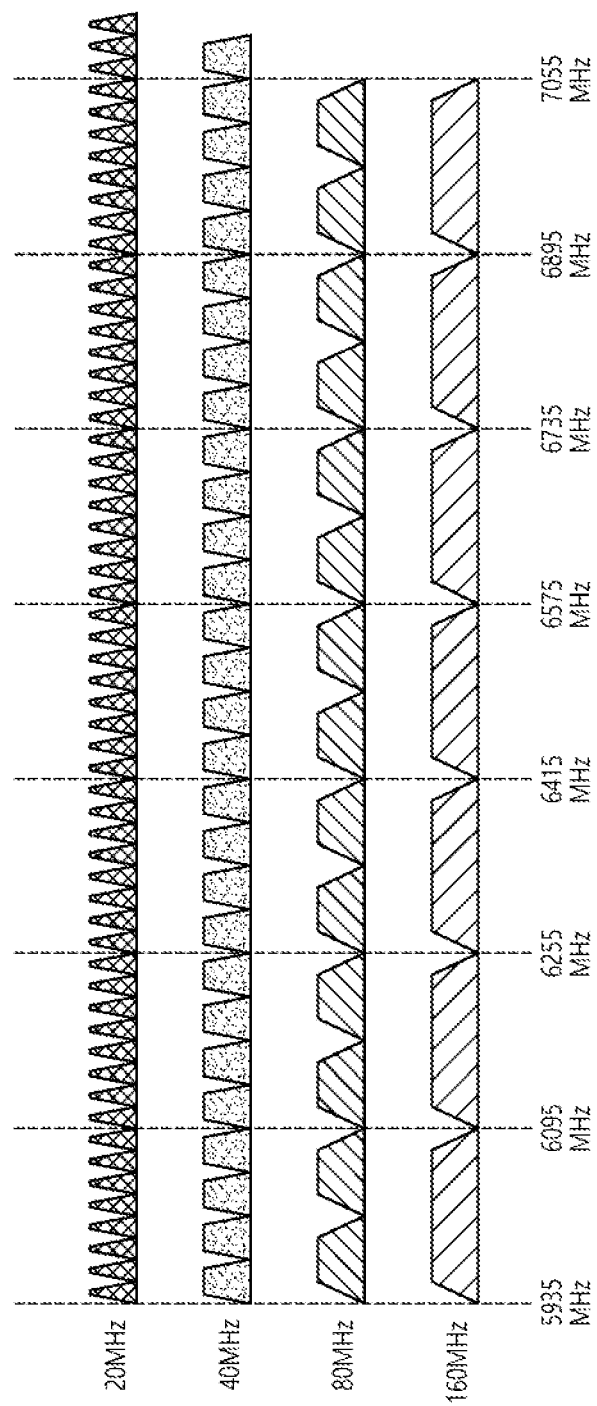
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | | 52 | 26 | 26 | 26 | 26 | 26 | 1 |
| 5 | 26 | 26 | | 52 | 26 | 26 | 26 | 52 | | 1 |
| 6 | 26 | 26 | | 52 | 26 | 52 | | 26 | 26 | 1 |
| 7 | 26 | 26 | | 52 | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | | 52 | 26 | 26 | 26 | 26 | 26 | 1 |
| 13 | 52 | | | 52 | 26 | 26 | 26 | 52 | | 1 |
| 14 | 52 | | | 52 | 26 | 52 | | 26 | 26 | 1 |
| 15 | 52 | | | 52 | 26 | 52 | | 52 | | 1 |
| 16 | 26 | 26 | 26 | 26 | 26 | 106 | | | | 1 |
| 17 | 26 | 26 | | 52 | 26 | 106 | | | | 1 |
| 18 | 52 | | 26 | 26 | 26 | 106 | | | | 1 |
| 19 | 52 | | | 52 | 26 | 106 | | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | | 26 | 26 | 26 | 26 | 26 | 1 |
| 21 | | 106 | | | 26 | 26 | 26 | 52 | | 1 |
| 22 | | 106 | | | 26 | 52 | | 26 | 26 | 1 |
| 23 | | 106 | | | 26 | 52 | | 52 | | 1 |
| 24 | 52 | | 52 | | — | 52 | | 52 | | 1 |
| 25 | 242-tone RU empty (with zero users) | | | | | | | | | 1 |
| 26 | | 106 | | | 26 | | | 106 | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | 52 + 26 | | 26 | | 1 |
| 60 | 26 | | 26 + 52 | | 26 | 26 | 26 | 26 | | 1 |
| 61 | 26 | | 26 + 52 | | 26 | 26 | 26 | 52 | | 1 |

TABLE 6-continued

| Indices | #1 | #2 | #3 | #4 | #5 | #6 | #7 | #8 | #9 | Number of entries |
|---|---|---|---|---|---|---|---|---|---|---|
| 62 | 26 |  | 26 + 52 |  | 26 | 52 |  | 26 | 26 | 1 |
| 63 | 26 | 26 | 52 |  | 26 | 52 + 26 |  | 26 |  | 1 |
| 64 | 26 |  | 26 + 52 |  | 26 | 52 + 26 |  | 26 |  | 1 |
| 65 | 26 |  | 26 + 52 |  | 26 | 52 |  | 52 |  | 1 |

TABLE 7

| 66 | 52 |  | 26 | 26 | 26 |  | 52 + 26 |  | 26 | 1 |
|---|---|---|---|---|---|---|---|---|---|---|
| 67 | 52 |  | 52 |  | 26 |  | 52 + 26 |  | 26 | 1 |
| 68 | 52 |  |  | 52 + 26 |  | 52 |  | 52 |  | 1 |
| 69 | 26 | 26 | 26 | 26 |  |  | 26 + 106 |  |  | 1 |
| 70 | 26 |  | 26 + 52 |  | 26 |  | 106 |  |  | 1 |
| 71 | 26 | 26 |  | 52 |  |  | 26 + 106 |  |  | 1 |
| 72 | 26 |  | 26 + 52 |  |  |  | 26 + 106 |  |  | 1 |
| 73 | 52 |  | 26 | 26 |  |  | 26 + 106 |  |  | 1 |
| 74 | 52 |  |  | 52 |  |  | 26 + 106 |  |  | 1 |
| 75 |  |  | 106 + 26 |  |  | 26 | 26 | 26 | 26 | 1 |
| 76 |  |  | 106 + 26 |  |  | 26 | 26 | 52 |  | 1 |
| 77 |  |  | 106 + 26 |  |  |  | 52 | 26 | 26 | 1 |
| 78 |  |  | 106 |  | 26 |  | 52 + 26 | 26 |  | 1 |
| 79 |  |  | 106 + 26 |  |  |  | 52 + 26 | 26 |  | 1 |
| 80 |  |  | 106 + 26 |  |  |  | 52 |  | 52 | 1 |
| 81 |  |  | 106 + 26 |  |  |  | 106 |  |  | 1 |
| 82 |  |  | 106 |  |  |  | 26 + 106 |  |  | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. Hereinafter, an example of a sequence for configuring an EHT-STF (i.e., an EHT-STF sequence) is proposed. The following sequence may be modified in various ways.

The EHT-STF may be configured based on the following sequence M.

$$M = \{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112:16:112) = \{M\}*(1+j)/\text{sqrt}(2) \quad \text{<Equation 2>}$$

EHT-STF(0)=0

The EHT-STF for the 40 MHz PPDU may be configured based on the following equation. The following example may be the first type (i.e., 1×STF) sequence.

$$\text{EHT-STF}(-240:16:240) = \{M,0,-M\}*(1+j)/\text{sqrt}(2) \quad \text{<Equation 3>}$$

The EHT-STF for the 80 MHz PPDU may be configured based on the following equation. The following example may be the first type (i.e., 1×STF) sequence.

$$\text{EHT-STF}(-496:16:496) = \{M,1,-M,0,-M,1,-M\}* (1+j)/\text{sqrt}(2) \quad \text{<Equation 4>}$$

The EHT-STF for the 160 MHz PPDU may be configured based on the following equation. The following example may be the first type (i.e., 1×STF) sequence.

$$\text{EHT-STF}(-1008:16:1008) = \{M,1,-M,0,-M,1,\\ -M,0,-M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496:16:496) = \{-M,-1,M,0,-M,1,-M\}* (1+j)/\text{sqrt}(2) \quad \text{<Equation 6>}$$

Equation 7 to Equation 11 below relate to an example of a second type (i.e., 2×STF) sequence.

$$\text{EHT-STF}(-120:8:120) = \{M,0,-M\}*(1+j)/\text{sqrt}(2) \quad \text{<Equation 7>}$$

The EHT-STF for the 40 MHz PPDU may be configured based on the following equation.

$$\text{EHT-STF}(-248:8:248) = \{M,-1,-M,0,M,-1,M\}* (1+j)/\text{sqrt}(2) \quad \text{<Equation 8>}$$

EHT-STF(−248)=0
EHT-STF(248)=0

The EHT-STF for the 80 MHz PPDU may be configured based on the following equation.

EHT-STF(−504:8:504)={M,−1,M,−1,−M,−1,M,0,−M, 1,M,1,−M,1,−M}*(1+j)/sqrt(2)      <Equation 9>

The EHT-STF for the 160 MHz PPDU may be configured based on the following equation.

EHT-STF(−1016:16:1016)={M,−1,M,−1,−M,−1,M,0,− M,1,M,1,−M,1,−M,0,−M,1,−M,1,M,1,−M,0,−M,1, M,1,−M,1,−M}*(1+j)/sqrt(2)      <Equation 10>

EHT-STF(−8)=0, EHT-STF(8)=0,
EHT-STF(−1016)=0, EHT-STF(1016)=0

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

EHT-STF(−504:8:504)={−M,1,−M,1,M,1,−M,0,−M,1, M,1,−M,1,−M}*(1+j)/sqrt(2)      <Equation 11>

EHT-STF(−504)=0,
EHT-STF(504)=0

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 µs. In addition, a GI (e.g., 0.8/1/6/3.2 µs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
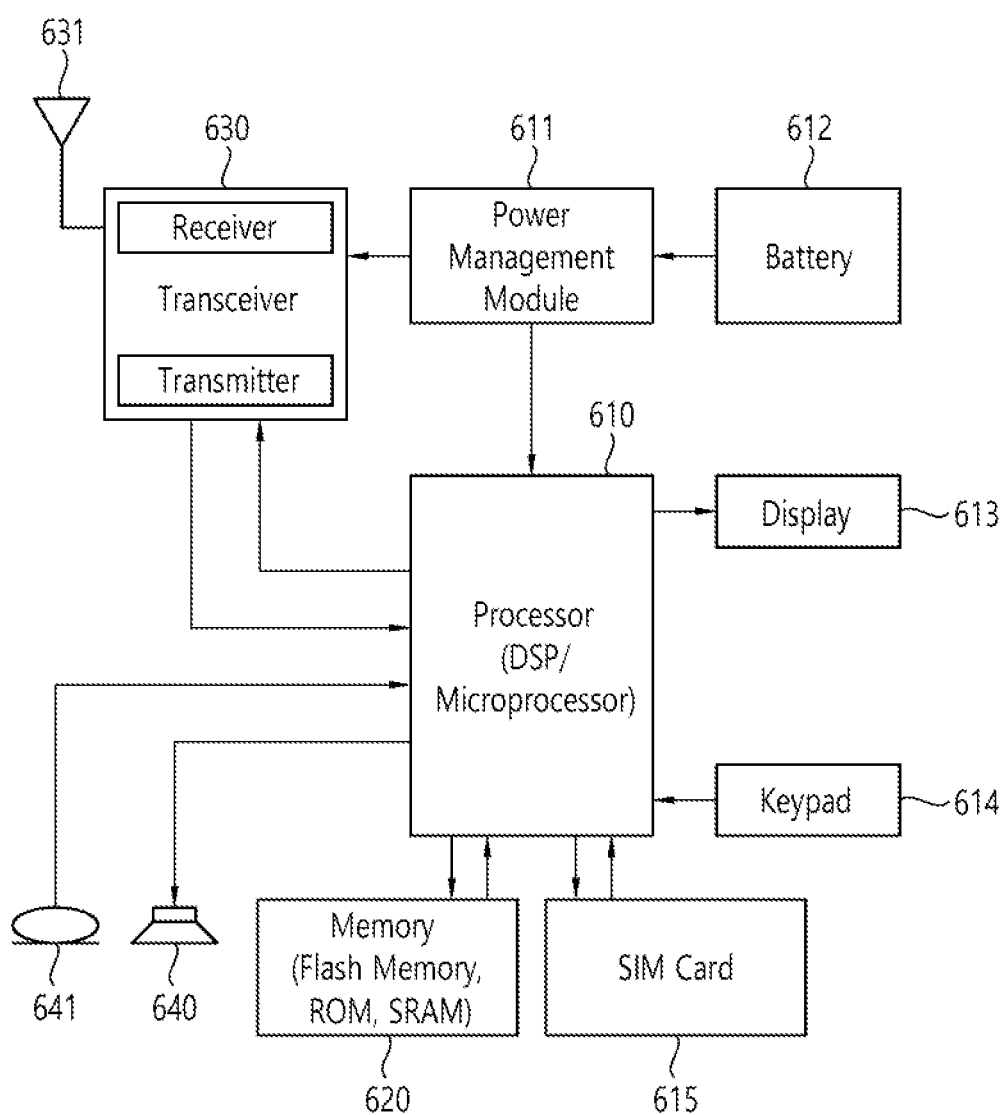
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

The STA described below may be an apparatus of FIG. 1 and/or FIG. 19, and the PPDU described below may be the PPDU of FIG. 18. The STA may be an AP or a non-AP STA. The STA (for example, AP or non-AP STA) described below may be a multi-link STA (for example, an AP multi-link device (MLD) or a non-AP STA MLD).

Mesh Wi-Fi (i.e., Multi-AP Solution) is gaining acceptance in the market for better coverage, easier deployment and higher throughput.

It is desirable to improve the performance of the Mesh Wi-Fi by joint optimization of MAC and PHY for multi-AP system. Hardware for multi-AP systems is already on the market and costs little, unlike 16 spatial-stream system.

There are excellent techniques for improving the performance of multi-AP systems. The examples of the techniques include distributed MIMO, coordinated transmission, space/time/frequency sharing and reuse, effective relay scheme, and the like.

Figure 20:
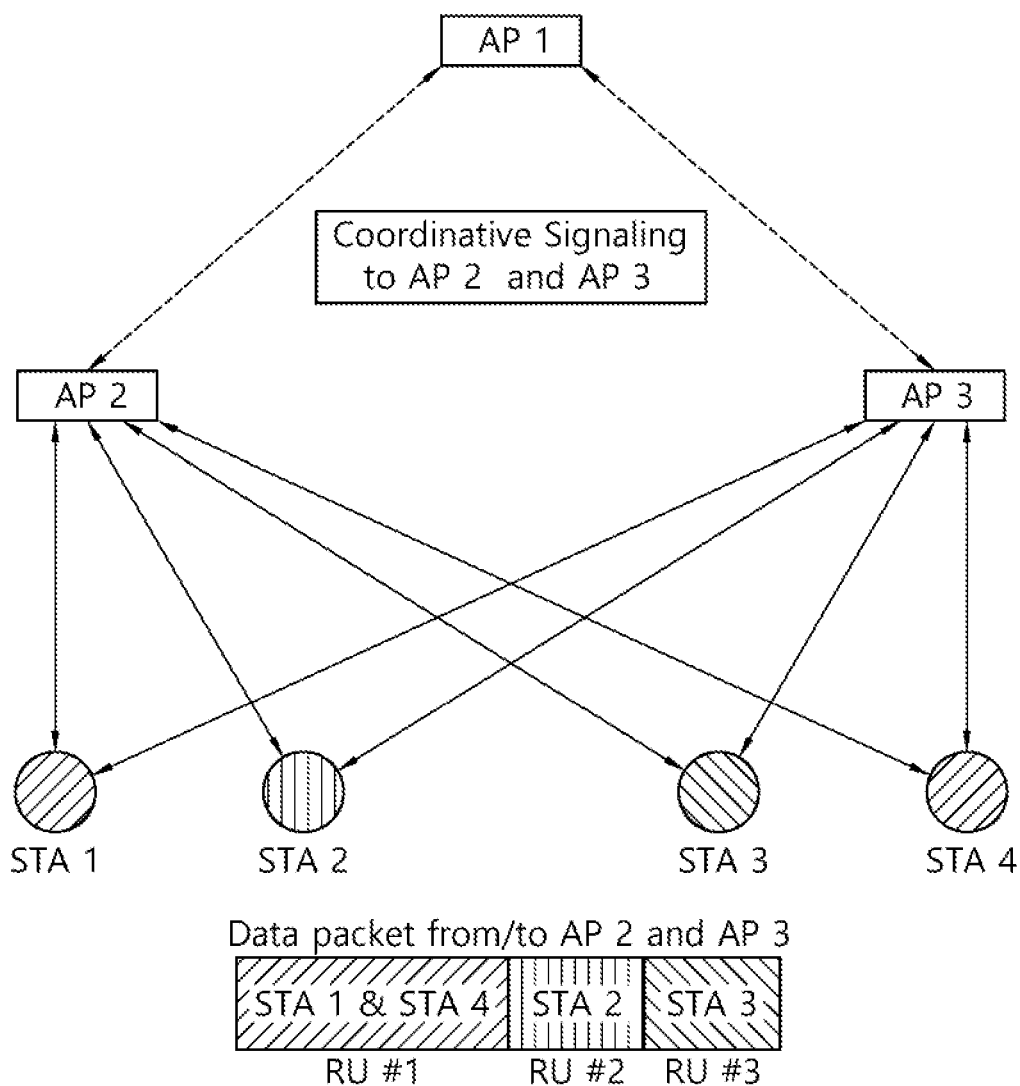
FIG. 20 shows an example of activating distributed MIMO transmission (e.g., joint transmission).

FIG. 20 shows an example of activating distributed MIMO transmission (e.g., joint transmission). Referring to FIG. 20, AP1 may start distributed MIMO transmission by sending a coordination signal to an AP2 and an AP3. The AP2 and AP3 may transmit/receive data to and from multiple STAs using OFDMA and MU-MIMO within one data packet. A STA2 and a STA3 may be allocated to different resource units (RUs), and each RU is a frequency segment. A STA1 and a STA4 may be allocated in the same resource unit using MU-MIMO. Each RU may be transmitted in multiple spatial streams.

Figure 21:
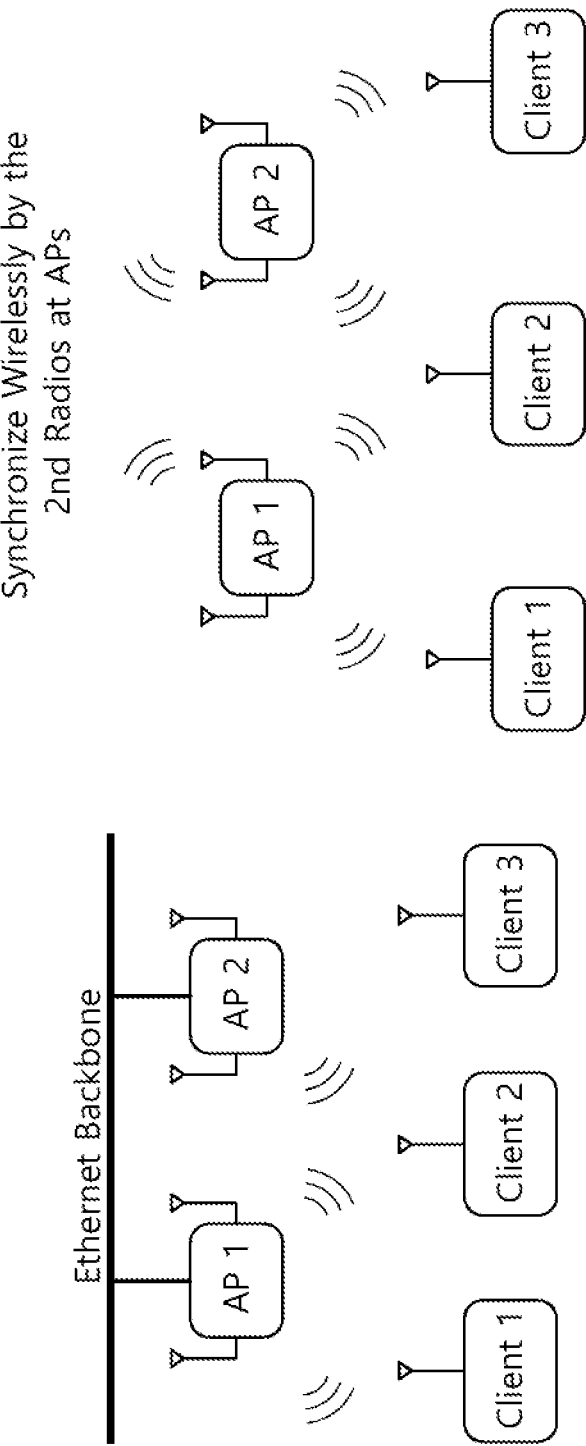
FIG. 21 is a diagram illustrating multi-AP coordination.

FIG. 21 is a diagram illustrating multi-AP coordination.

Multi-AP coordination utilizes a wired (e.g., enterprise) or wireless (e.g., home mesh) backbone for data and clock synchronizations.

In addition, the multi-AP coordination has improved link budget and regulatory power limits over single APs with large antenna arrays.

Techniques of the multi-AP coordination include null steering for interference avoidance, joint beamforming, and joint MU-MIMO.

Example 1: Null Steering for Interference Avoidance

Figure 22:
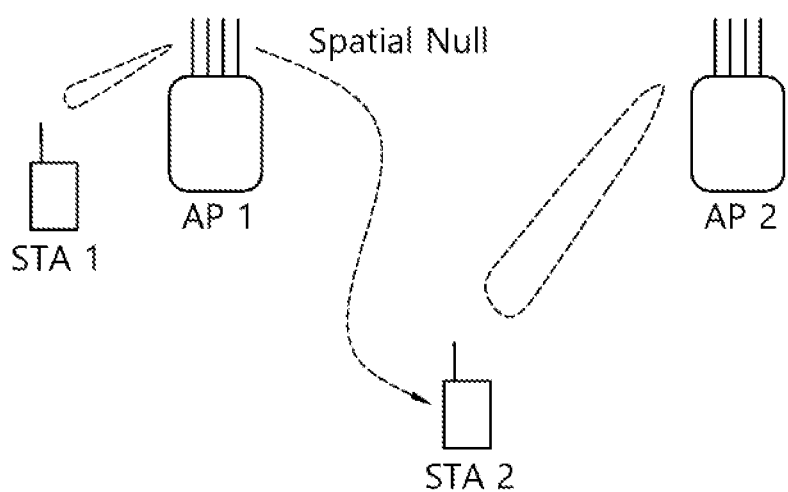
FIG. 22 shows an example of a null steering operation for interference avoidance.

FIG. 22 shows an example of a null steering operation for interference avoidance. The null steering for interference avoidance may be useful when the multi-AP has a large dimension (e.g., 4×4 or 8×8).

Figure 23:
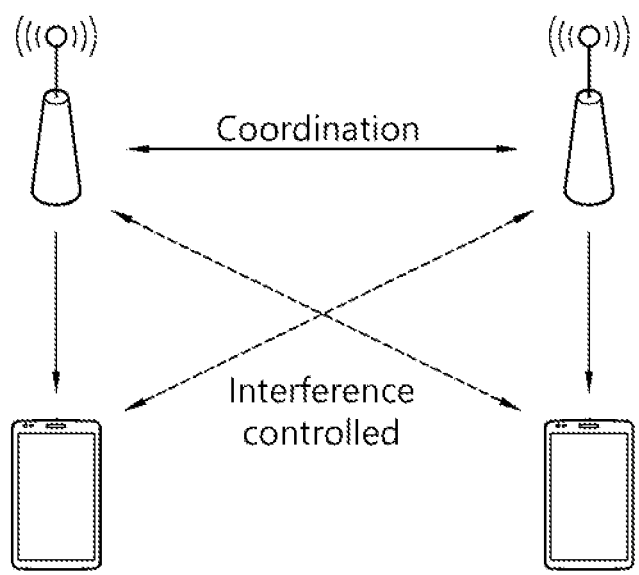
FIG. 23 shows an example in which AP coordination and interference are controlled.

FIG. 23 shows an example in which AP coordination and interference are controlled.

Coordinated scheduling: The coordinated scheduling may mitigate/reduce the number of collisions from APs/STAs of other BSSs.

In addition, the coordinated scheduling is a distributed mechanism and increases the number/probability of parallel transmission in a coordinated manner than spatial reuse. Message exchange between APs may be required.

Figure 24:
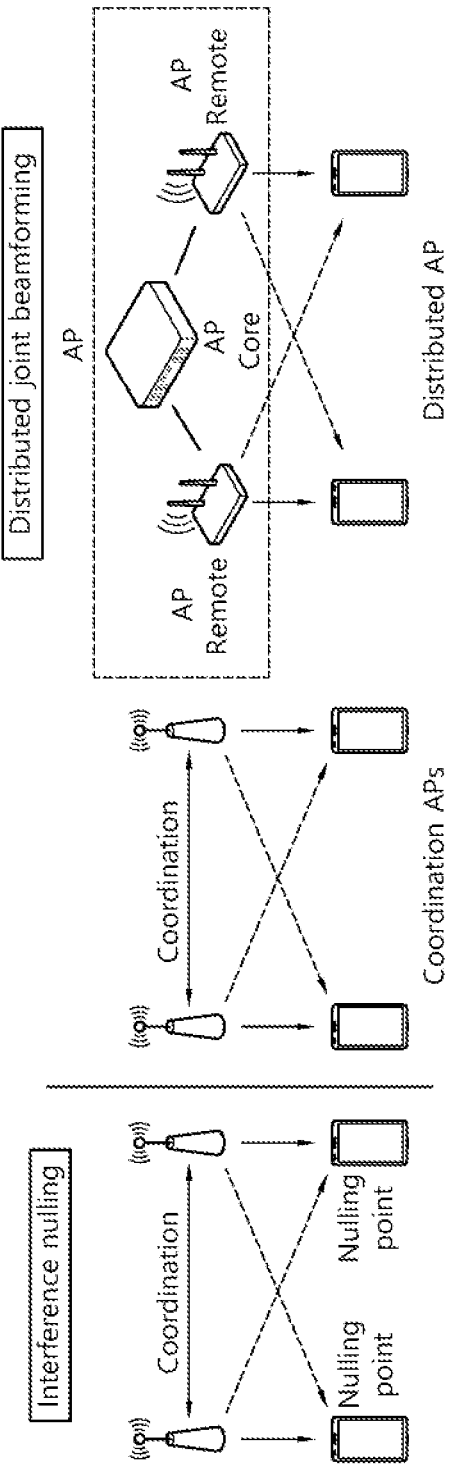
FIG. 24 shows interference nulling and distributed joint beamforming.

FIG. 24 shows interference nulling and distributed joint beamforming.

Coordinated beamforming: In the coordinated beamforming, downlink transmission can be performed simultaneously without co-channel interference due to beamforming, such as designating a nulling point to another STA or using distributed joint beamforming.

In addition, the coordinated beamforming may be suitable for managed deployments (e.g., corporate offices, hotels) and has the advantages of area throughput and consistent user experience. In addition, the coordinated beamforming may require coordinated downlink scheduling and improved MU sounding to reduce overhead, synchronization, and the like.

Multi-AP coordination technology in the wireless LAN system minimizes interference between BSSs during data transmission or increases data transmission efficiency by participating in two or more APs on a specific time point of data transmission/reception to a terminal by sharing channel feedback information and scheduling information of the terminal between APs when transmitting and receiving data frames between the terminal and the APs. In the wireless LAN system, this Multi-AP coordination technology has not been standardized yet, but recently, in the IEEE802.11 EHT TIG, standardization related to the Multi-AP coordination as a next-generation technology is being newly discussed. In the present specification, a method in which multiple APs can participate in data transmission using the multi-AP coordination in a wireless LAN system is proposed. Multi-AP (MAP) transmission may include joint transmission and coordinated transmission. The joint transmission is a method in which multiple APs simultaneously transmit one data to a STA using their own antennas. The coordinated transmission is a method of simultaneously transmitting one data to the STA using a coordinated scheduling scheme, a coordinated beamforming scheme, a C-OFDMA scheme, a coordinated spatial reuse scheme, and the like. The coordinated spatial reuse method is a method of reusing the same time-frequency resource in different spaces using power strength.

An example of the present specification described below relates to a technical feature in which a master AP controls signal transmission of slave APs. The apparatus/device described below (e.g., master AP, slave AP, station) may be STAs of FIG. 1. Further, the signals or PPDUs described below may be based on the PPDU of FIG. 18.

In the present specification, a sharing AP may include an AP performing a master AP operation. The sharing AP of the present specification may be replaced with various expressions/terminologies. For example, the sharing AP may be replaced by various terminologies, such as a master AP, a first AP, and/or a transmitting AP. In the present specification, the shared AP may include an AP that performs a slave AP operation. The shared AP in the present specification may be replaced with various terminologies. For example, the shared AP may be replaced with various expressions such as a slave AP, a first AP, and/or a transmitting AP.

Figure 25:
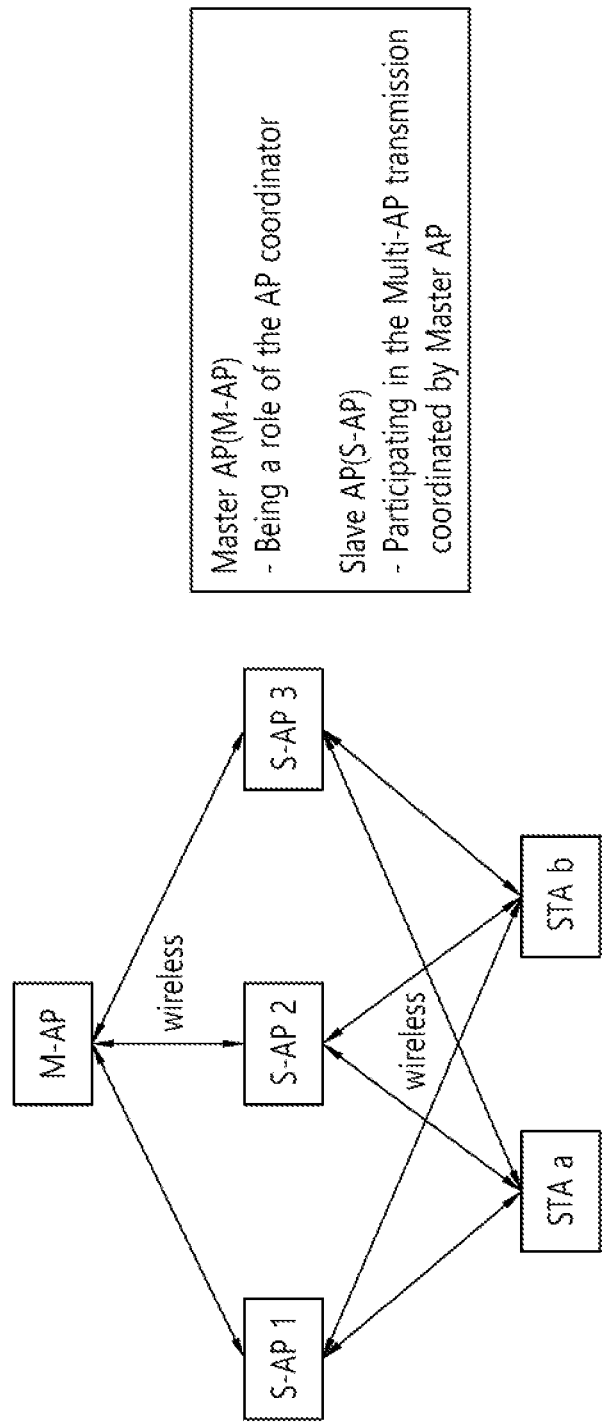
FIG. 25 and FIG. 26 illustrating an example of a network configured with multiple APs.

FIG. 25 is a diagram illustrating an example of a network configured with multiple APs.

Referring to FIG. 25, there may be two types of access points (APs) in the WLAN system. For example, there may be a master AP (Master AP, M-AP) and a slave AP (Slave AP, S-AP). The master AP may be referred to as a sharing AP, and the slave AP may be referred to as a shared AP. In this specification, the terms master AP and slave AP may be used. The Multi-AP transmission may refer to a method of transmitting a signal to a STA using a plurality of APs. For example, the multi-AP transmission may mean a transmission method such as distributed MIMO, C-OFDMA, coordinated beamforming, coordinated spatial reuse, and the like. APs (e.g., master AP, slave AP, etc.) may transmit and receive signals through a wireless communication with each other.

The master AP may select a plurality of slave APs that perform the multi-AP transmission with the slave APs. For example, the slave AP-1, slave AP-2, and slave AP-3 selected by the master AP may perform signal transmission to STA-a and STA-b.

The master AP may serve to coordinate a plurality of APs existing in the WLAN system. For example, the master AP may serve to initiate and control the multi-AP transmission. For example, the master AP may group the slave APs and manage a link with the slave APs to share information between the slave APs. For example, the master AP may manage information related to BSSs configured by slave APs and information related to STAs associated with the BSS.

The slave AP may be coordinated by the master AP and may participate in the multi-AP transmission. For example, the slave AP may establish an association with the master AP, and may share control information, management information, and data traffic with the master AP. For example, the slave AP may basically perform the same function as the AP capable of forming the BSS in the existing WLAN.

Slave APs that are candidates for the multi-AP transmission may directly transmit/receive with the master AP. STAs, which are receivers of the multi-AP transmission, may be able to directly transmit/receive with slave APs. The master AP and the STAs may not be able to directly transmit/receive to each other, but the master AP may know the existence of the STAs. The STAs may be associated with one slave AP among one slave AP.

Figure 26:
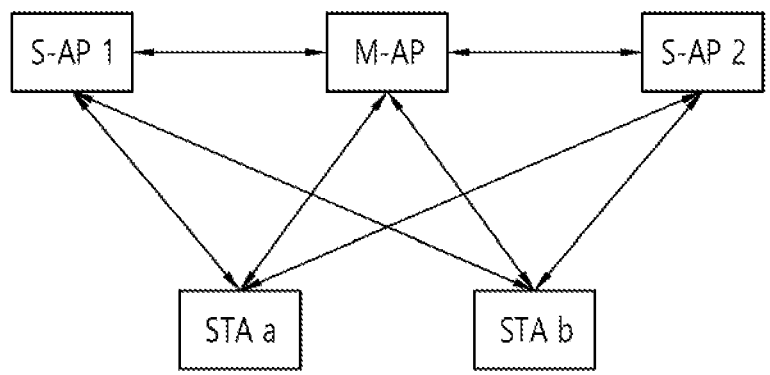

FIG. 26 is a diagram illustrating an example of a network configured with multiple APs.

Referring to FIG. 26, there may be two types of access points (APs) in the WLAN system. For example, there may be a master AP (Master AP, M-AP) and a slave AP (Slave AP, S-AP). The master AP may be referred to as a sharing AP, and the slave AP may be referred to as a shared AP. In this specification, the terms master AP and slave AP may be used. The Multi-AP transmission may refer to a method of transmitting a signal to a STA using a plurality of APs. For example, the multi-AP transmission may mean a transmission method such as distributed MIMO, C-OFDMA, coordinated beamforming, coordinated spatial reuse, and the like. APs (e.g., master AP, slave AP, etc.) may transmit and receive signals through a wireless communication with each other. The STA may be associated with one of the slave AP or the master AP.

The master AP may select a plurality of slave APs that perform the multi-AP transmission with the slave APs. For example, the slave AP-1, the slave AP-2 selected by the master AP and the master AP itself may perform signal transmission to STA-a and STA-b.

The master AP may serve to coordinate a plurality of APs existing in the WLAN system. For example, the master AP may serve to initiate and control the multi-AP transmission. For example, the master AP may group the slave APs and manage a link with the slave APs to share information between the slave APs. For example, the master AP may manage information related to BSSs configured by slave APs and information related to STAs associated with the BSS.

The slave AP may be coordinated by the master AP and may participate in the multi-AP transmission. For example, the slave AP may establish an association with the master AP, and may share control information, management information, and data traffic with the master AP. For example, the slave AP may basically perform the same function as the AP capable of forming the BSS in the existing WLAN.

Slave APs that are candidates for the multi-AP transmission may directly transmit/receive with the master AP. STAs, which are receivers of the multi-AP transmission, may be able to directly transmit/receive with slave APs. The master AP and the STAs may be able to directly transmit/receive to each other.

Through the process of sounding and selection, the sharing AP can acquire/obtain a channel (or channel information) between the shared APs and the STA. For example, the sharing AP may acquire/obtain a channel between the shared APs and the STA through a sounding procedure, and select shared APs for transmitting a signal to the STA based on the acquired channel information. Based on the acquired channel information, the sharing AP can perform the multi-AP transmission (e.g., Joint TX, Coordinated BF, Coordinated OFDMA, Coordinated SR).

In a multi-AP environment where data is transmitted using multiple APs at the same time, the AP can be configured as a Master AP (or Sharing AP) that controls multiple APs and configured as multiple Slave APs (or Shared AP) participating in Multi-AP transmission.

Multi-AP coordination technology in a WLAN system shares channel feedback information and scheduling information of STAs between APs, so that interference between BSSs when transmitting and receiving data between AP and STA is minimized and data transmission efficiency is increased by having two or more APs participate in data transmission/reception to and from the STA at a specific time. Hereinafter, a method for improving system performance by using Multi-AP coordination in a WLAN system is described.

In a multi-AP environment where data is transmitted using multiple APs at the same time, since multiple APs participate in transmission, a multi-AP coordination environment must be created to coordinate multiple APs. In order for APs to be coordinated, a link between the APs must be formed, and information necessary for multi-AP transmission, such as link information on a STA associated with each AP, must be shared.

Hereinafter, a link establishment method for the STA to use a multi-AP transmission technology by comparing link quality with neighboring APs will be described.

Figure 27:
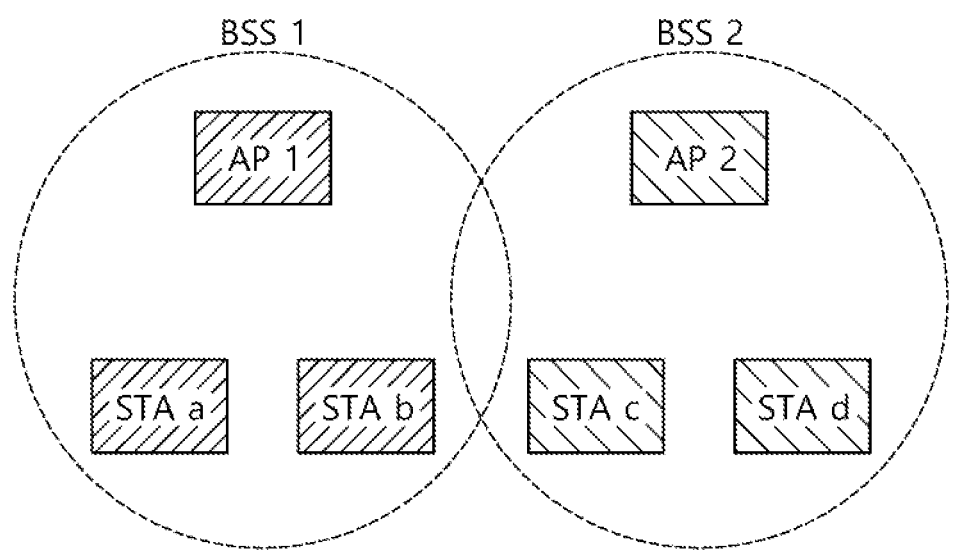
FIG. 27 is a diagram illustrating an example of a network configured with multiple APs.

FIG. 27 is a diagram illustrating an example of a network configured with multiple APs.

Referring to FIG. 27, AP 1 performs an association with STA a and STA b to configure BSS 1. AP 2 performs an association with STA c and STA d to configure BSS 2.

1. Protocol for Multi-AP Coordination Setup

Figure 28:
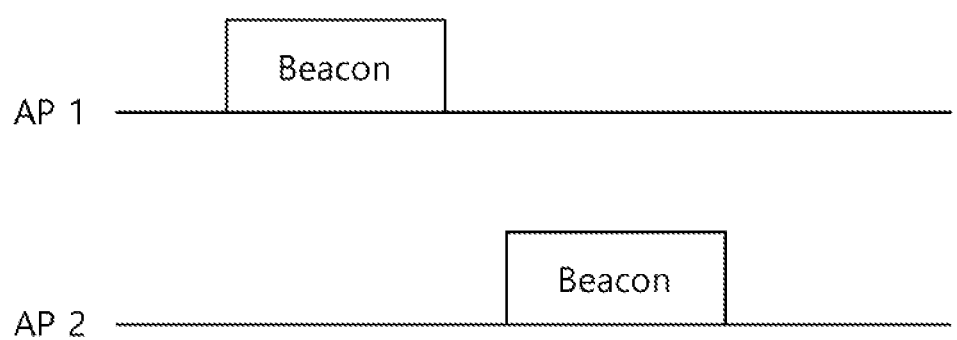
FIG. 28 is a diagram illustrating an embodiment of a method of transmitting a beacon frame.

FIG. 28 is a diagram illustrating an embodiment of a method of transmitting a beacon frame.

Referring to FIG. 28, AP 1 and AP 2 may periodically transmit a beacon frame.

For multi-AP coordination setup, when transmitting a beacon frame and/or a management frame, AP 1 and AP 2 may transmit capability information for participating in multi-AP transmission to neighboring APs or STAs.

A method for an AP transmitting a beacon frame and/or a management frame to transmit its own Multi-AP capability information is as follows.

Figure 29:
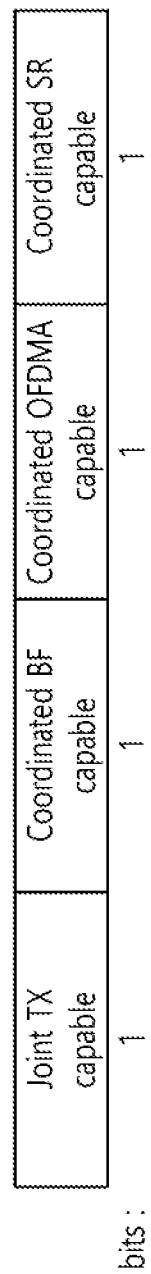
FIG. 29 is a diagram illustrating an embodiment of Multi-AP capability information.

FIG. 29 is a diagram illustrating an embodiment of Multi-AP capability information.

Referring to FIG. 29, the Beacon frame or the management frame may include an EHT Capabilities element or an EHT Operation element. The EHT Capabilities element or EHT Operation element may include a Joint TX capable, a Coordinated BF (beam forming) capable, a Coordinated OFDMA capable, a Coordinated SR (spatial reuse) capable field. Each field may include information on whether each of the Multi-AP transmission methods supports Joint TX, Coordinated BF, Coordinated OFDMA, and Coordinated SR methods.

The AP or STA, that has received the beacon frame and/or the management frame including the indication for the multi-AP capability, may know that the AP, that has transmitted the beacon frame or management frame including the indication for multi-AP capability, is an AP capable of multi-AP transmission.

The STA that has received the beacon or management frame transmitted by neighboring APs may measure the link quality between the AP and itself by using the corresponding frame.

Link quality refers to a received signal strength indicator (RSSI), a signal to noise ratio (SNR), a signal to interference plus noise ratio (SINR), channel state information (CSI), a channel quality indicator (CQI), and the like.

2. STA-Based Multi-AP Coordination Setup

Figure 30:
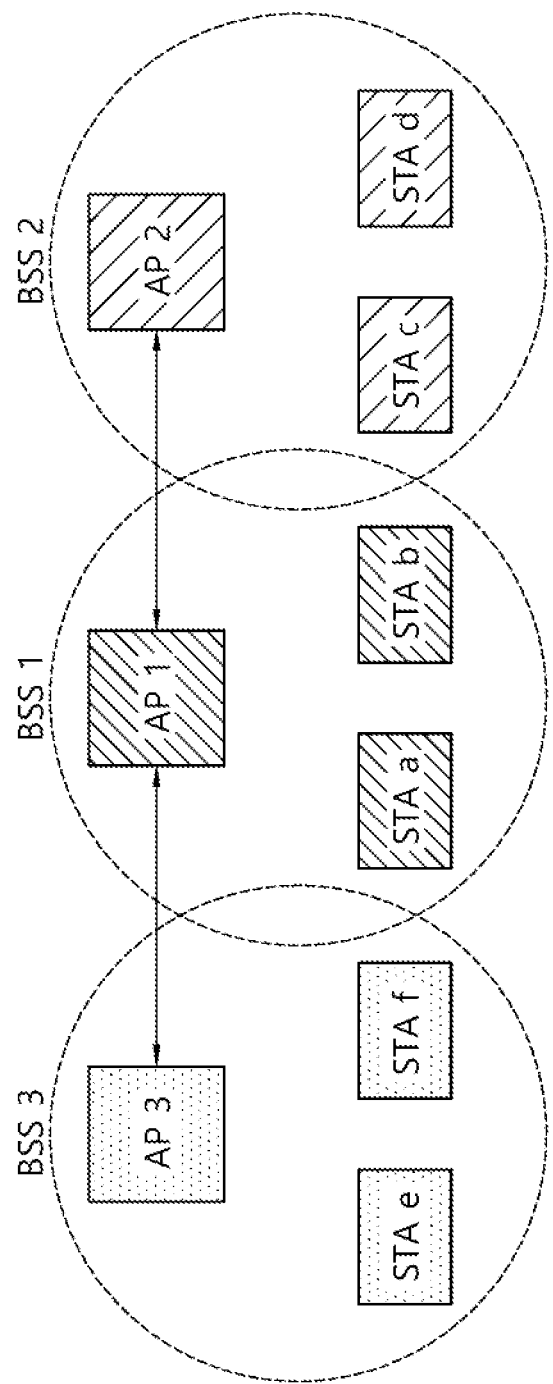
FIG. 30 is a diagram illustrating an example of a network performing STA-based Multi-AP coordination setup.

FIG. 30 is a diagram illustrating an example of a network performing STA-based Multi-AP coordination setup.

Referring to FIG. 30, each AP may configure a BSS to operate, and STAs within each BSS may perform signal transmission/reception with the AP constituting the BSS. BSS1 may include AP1, STA a, and STA b, BSS2 may include AP2, STA c, STA d, and BSS3 may include AP3, STA e, and STA f.

STAs in the BSS may know which AP has the capability to participate in the Multi-AP coordination set through a beacon frame or a management frame transmitted from an AP of a neighboring BSS (OBSS) other than the BSS to which they belong. For example, STAs in the BSS may obtain information on an AP capable of performing multi-AP transmission through a beacon frame and/or a management frame received from the AP of the OBSS.

For example, AP 1, AP 2, and AP 3 have Multi-AP capability, and through a Beacon frame or a management frame, STAs may know whether APs have the multi-AP capability (that is, whether APs can perform multi-AP transmission).

When AP 1 initiates Multi-AP coordination, AP 1 becomes the Master AP. For example, AP 1 that has obtained TXOP may become a master AP.

AP 1, acting as a Master AP, may select APs with neighboring Multi-AP capability to perform Multi-AP coordination. In order to select an AP, the Master AP may make a request to each STA to inform which AP is preferred for multi-AP coordination establishment among APs other than itself. That is, the Master AP may request, to the STAs, information on which AP is the most appropriate AP as an AP to perform the role of the Slave AP.

The STA receiving the request may select an AP with good link quality based on the link quality measured using the beacon or management frame transmitted by the neighboring APs, and may inform the Master AP.

The number of APs that the STA informs the Master AP may be one or more. When reporting one or more APs to the Master AP, it can be reported by listing them in the order of link quality. That is, the STA may transmit to the Master AP a report signal including information on APs listed in order of highest link quality.

When the STA reports neighboring APs having good link quality to the Master AP, the STA may transmit at least one information of a received signal strength indicator (RSSI), a Signal to noise ratio (SNR), a signal to interference plus noise ratio (SINR), channel state information (CSI), a channel quality indicator (CQI) related to a link quality measurement result between each AP and the STA itself.

The Master AP, which has received information on the neighboring APs preferred by the STA from the STA, may select an AP (that is, a slave AP) to participate in Multi-AP coordination among neighboring APs by using the information. The AP selected in this way plays the role of a slave AP in Multi-AP coordination.

Figure 31:
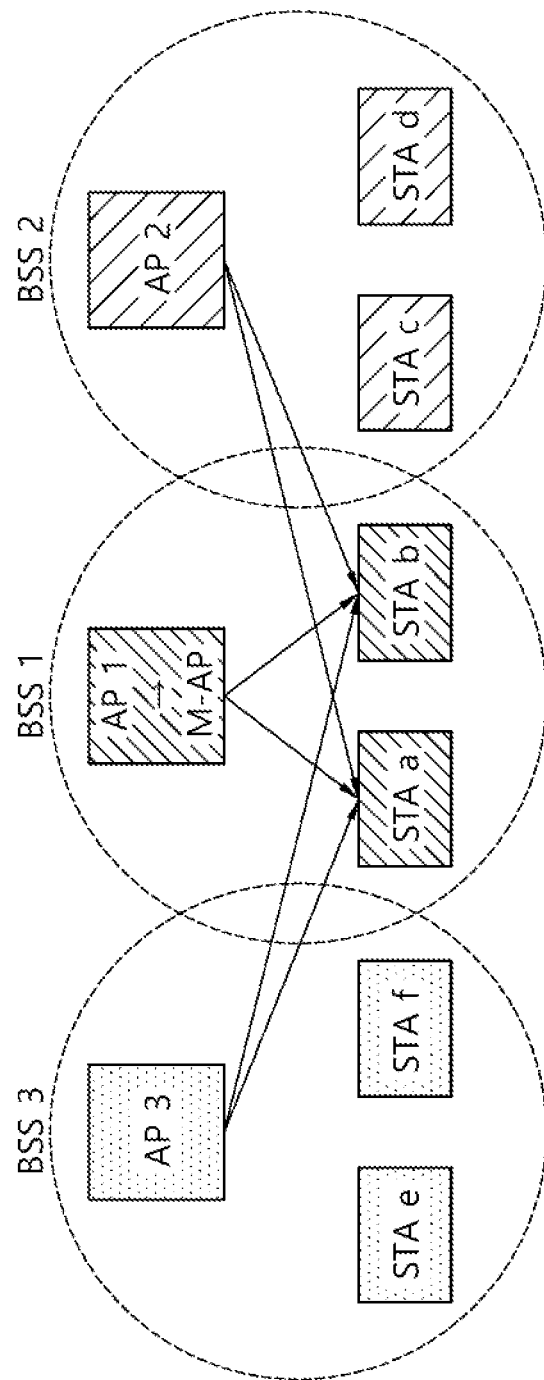
FIG. 31 is a diagram illustrating an example of a network performing STA-based Multi-AP coordination setup.

FIG. 31 is a diagram illustrating an example of a network performing STA-based Multi-AP coordination setup.

Referring to FIG. 31, multi-AP coordination may be performed using link quality with neighboring APs measured by the STA.

AP 1 may transmit a request frame to the STAs in order to obtain information on what are the preferred APs around for STAs in their BSS, and what is the link quality. AP 1 may perform the role of a Master AP initiating Multi-AP coordination.

STA a and STA b in BSS 1 may know the link quality between themselves and APs (that is, AP2, AP3) based on the beacon and/or management frame transmitted by AP 2 and AP 3.

STA a may know link quality information between STA a and AP 2 and between STA a and AP 3.

STA b may know link quality information between STA b and AP 2 and STA b and AP 3.

Figure 32:
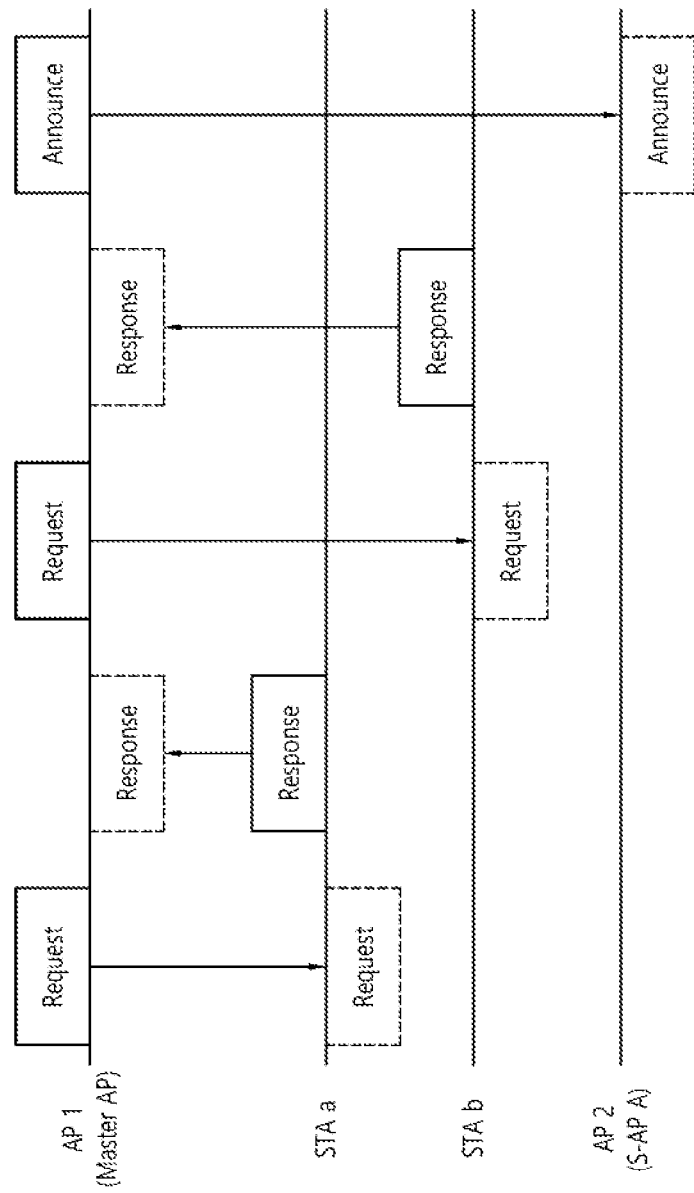
FIG. 32 is a diagram illustrating an embodiment of a method for a Master AP to select an SAP.

FIG. 32 is a diagram illustrating an embodiment of a method for a Master AP to select an SAP.

Referring to FIG. 32, the master AP may obtain information on the AP preferred by STAs.

AP 1, which is the master AP, may transmit a signal (request frame) to STA a requesting to report on a nearby AP which is hearable and the link quality from that AP based on the beacon or management frame received by STA a. For example, the Master AP may transmit, to STA a, a request frame requesting to report information on an AP capable of transmitting and receiving data and link quality between STA a and the AP through which the STA a can transmit and receive data.

Information requested through the Request frame (from AP 1 to STA a)
 an AP preferred by STA
 Order of APs preferred by STA
 Link qualities of the APs preferred by the STA (at least one information among an RSSI, an SNR, an SINR, CSI, and a CQI may be included).

Upon receiving the request frame from the master AP, STA a may transmit a response frame to the preferred AP based on the beacon and/or management frame received from the neighboring AP according to the request of the master AP.

Information included in the Response frame (from AP 1 to STA a)
- an AP preferred by STA
- Order of APs preferred by STA
- Link qualities of the APs preferred by the STA (at least one information among an RSSI, an SNR, an SINR, CSI, and a CQI may be included).

AP 1, which is the master AP, requests STA b to report on a certain AP, which is hearable, and the link quality of the certain AP based on the Beacon and/or management frame received by STA b, and performs the operation of receiving a response to the corresponding information from STA b in the same manner as above. For example, the Master AP may transmit, to STA b, a request frame requesting to report information on AP to which STA b can transmit and receive data, and link quality between STA b and the AP through which the STA b can transmit and receive data. The Master AP may receive a response frame from STA b.

The Multi-AP coordination service set to be described below may mean a BSS that performs multi-AP transmission/reception. For example, the multi-AP coordination service set may mean a Master AP, a Slave AP, and STAs associated with the Master AP and the Slave AP.

The master AP may know information about APs that are candidates for the multi-AP coordination service set from STA a and STA b, and may finally select a slave AP in consideration of the link quality between each STA and the candidate APs. For example, the master AP may obtain, from STAs a and b, information (for example, AP ID, link quality) about APs that are SAP candidates to perform multi-AP transmission, and may select a Slave AP based on the information.

STA a may respond that it prefers only AP 2 or AP 3, or may respond that it prefers both AP 2 and AP 3. The same is applied for STA b. STA a may transmit information on priorities between preferred APs.

The master AP may select only AP 2 or AP 3 as a slave AP using the response frame transmitted by STA a and STA b, and may select both AP 2 and AP 3 as slave APs.

Figure 33:
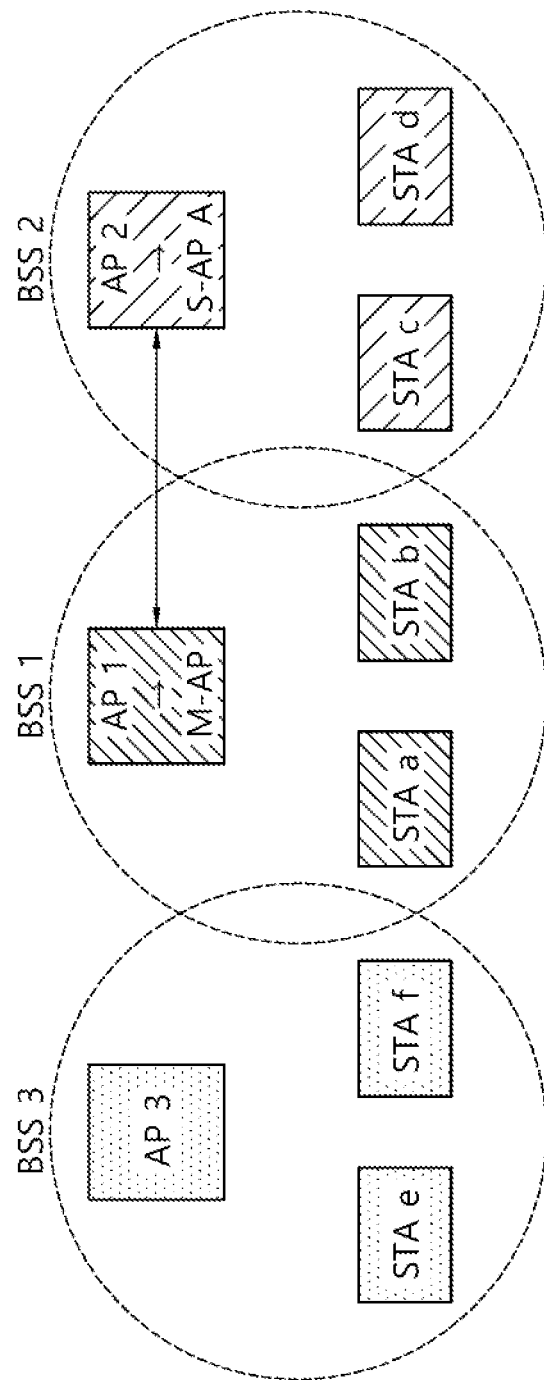
FIG. 33 is a diagram illustrating an example of a network performing STA-based Multi-AP coordination setup.

FIG. 33 is a diagram illustrating an example of a network performing STA-based Multi-AP coordination setup.

Referring to FIG. 33, the master AP may select only AP 2 as a slave AP by transmitting an announce frame. Multi-AP coordination service set can be composed of Master AP, which is AP 1, and Slave AP A, which is AP 2.

Information included in the Announce frame (from AP 1 to AP 2)
- Multi-AP group ID
- Identifier of AP 2 (Slave AP A) in Multi-AP coordination: AP 2 operates in the Multi-AP coordination environment through the corresponding ID thereafter. For example, AP 2 may be assigned a separate ID in the Multi-AP coordination service set.

Upon receiving the Announce frame, the AP can know that it has been selected as the slave AP.

The master AP may acquire link quality information between the STA and a neighboring AP through the STAs, and may configure a coordination service set using the information.

Therefore, The Master AP can perform efficient Multi-AP transmission, not by randomly engaging all surrounding APs in the Multi-AP coordination service set, and by selectively participating only APs with good link quality reported by the STA in the Multi-AP coordination service set.

The Master AP can configure the Multi-AP coordination service set using the above method, and can perform sounding and data transmission using the Multi-AP with the information obtained in this process.

3. Both AP and STA-Based Multi-AP Coordination Setup

Figure 34:
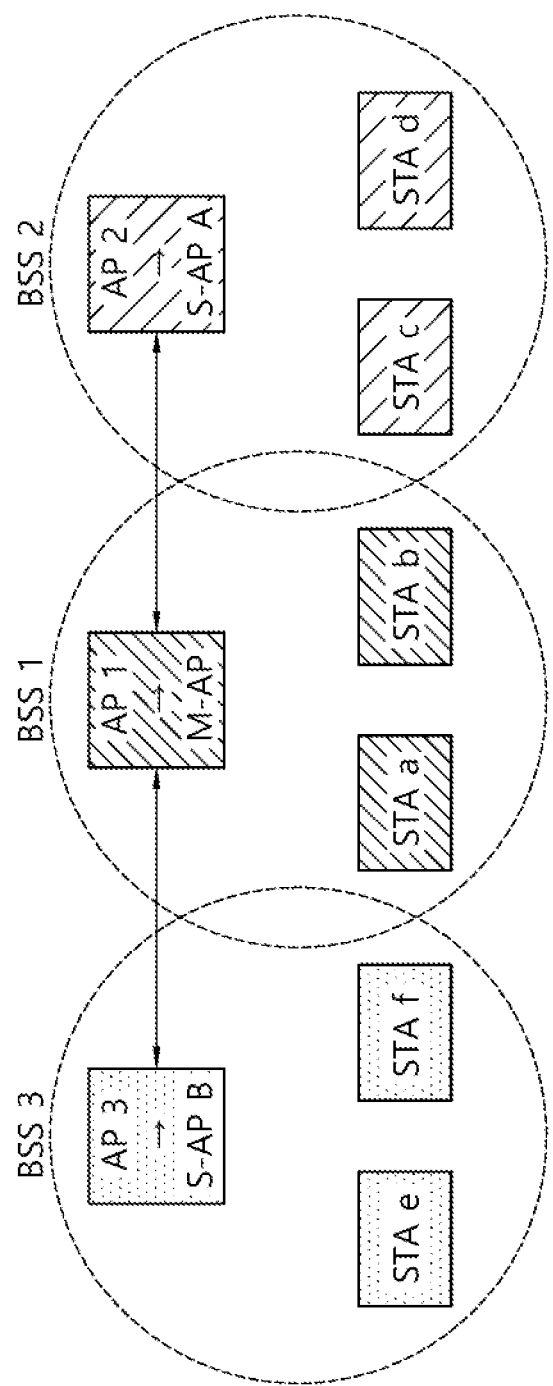
FIG. 34 is a diagram illustrating an example of a network performing both AP and STA-based Multi-AP coordination setup.

FIG. 34 is a diagram illustrating an example of a network performing both AP and STA-based Multi-AP coordination setup.

Referring to FIG. 34, each AP may configure a BSS to operate, and STAs within each BSS may perform signal transmission/reception with the AP constituting the BSS. BSS1 may include AP1, STA a, and STA b, BSS2 may include AP2, STA c, STA d, and BSS3 may include AP3, STA e, and STA f.

STAs in the BSS may know which AP has the capability to participate in the Multi-AP coordination set through a beacon frame or a management frame transmitted from an AP of a neighboring BSS (OBSS) other than the BSS to which they belong. For example, STAs in the BSS may obtain information on an AP capable of performing multi-AP transmission through a beacon frame and/or a management frame received from the AP of the OBSS.

For example, AP 1, AP 2, and AP 3 have Multi-AP capability. Through the beacon frame or the management frame, STAs may know whether APs have the multi-AP capability (that is, whether APs can perform multi-AP transmission). Through the Beacon frame or the management frame, STAs (STA a, STA b, STA c, STA d, STA e, STA f) may know whether APs have the multi-AP capability (that is, whether APs can perform multi-AP transmission).

When AP 1 initiates Multi-AP coordination, AP 1 becomes the Master AP. For example, AP 1 that has obtained TXOP may become a master AP.

AP 1 serving as a Master AP may select neighboring APs with Multi-AP capability for multi-AP coordination. For example, the Master AP may select AP2 and AP3. AP 2 may serve as a slave AP A, and AP 3 may serve as a slave AP B.

The Master AP can control Multi-AP transmission by coordinating Slave APs.

Slave AP can participate in Multi-AP transmission under the control of Master AP.

The procedure for the master AP to select the slave AP may be as follows.

Figure 35:
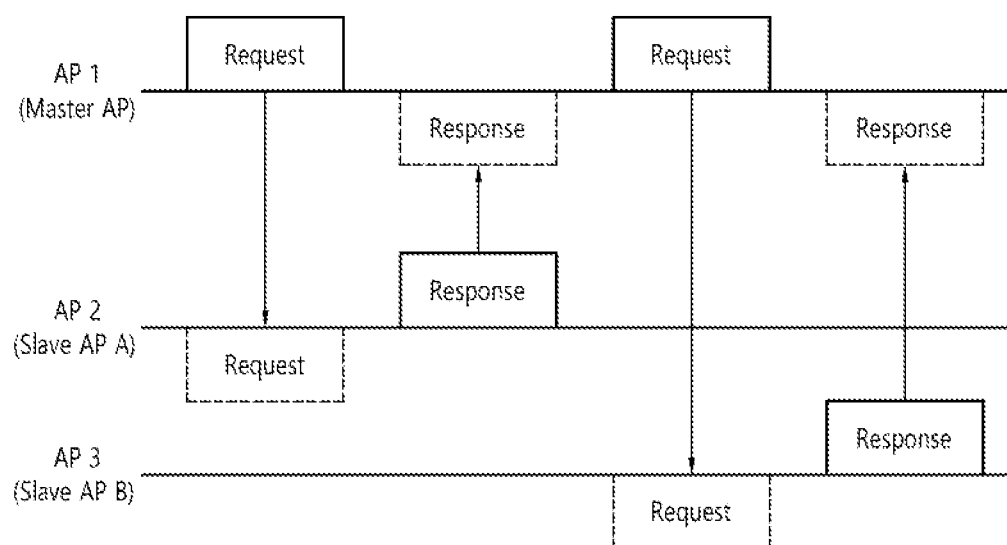
FIG. 35 is a diagram illustrating an example of a method in which a master AP and a slave AP perform coordination.

FIG. 35 is a diagram illustrating an example of a method in which a master AP and a slave AP perform coordination.

Referring to FIG. 35, AP 1 may operate as a master AP, AP 2 may operate as a slave AP A, and AP 3 may operate as a slave AP B.

The AP 1, which is the master AP, may transmit a request frame to AP 2. The request frame may indicate the fact that AP 2 is a slave AP A. The Master AP may request, through the request frame, information of BSS 2 to which AP 2 belongs.

Upon receiving the request frame transmitted by AP 1, AP 2 can know that it is a slave AP A. AP 2 may transmit, to AP 1, a response frame including information requested by AP 1.

Information included in the request frame (from AP 1 to AP 2)
- Multi-AP group ID
- Identifier of AP 2 (Slave AP A) in Multi-AP coordination: AP 2 operates in the Multi-AP coordination environment through the corresponding ID thereafter. For example, AP 2 may be assigned a separate ID in the Multi-AP coordination service set.
- BSS information of AP2 requested to AP2: Information on which BSS information the Master AP requests to AP2 may be included. For example, the BSS ID, ID and capability of STAs belonging to the BSS, information on STAs capable of participating in sounding, buffer status in the BSS, MIMO of AP 2, and RF capability may be requested.

Information included in the response frame (from AP 2 to AP 1)

AP 2 may transmit a response frame including information requested by AP 1, which is the master AP.

BSS information of AP2: BSS ID of AP2, identifier and capability of STAs associated with AP2, identifiers of STAs that AP2 intends to transmit data using the Multi-AP technique, identifiers of STAs to participate in the multi-AP sounding process, buffer status of AP 2 and STAs in the corresponding BSS, MIMO of AP 2, RF capability The AP 1, which is a master AP, may transmit a request frame to AP 3. The request frame may indicate the fact that AP 3 is Slave AP B. The master AP may request, through the request frame, information of BSS 3 to which AP 3 belongs.

Upon receiving the request frame transmitted by AP 1, AP 3 can know that it is Slave AP B. A response frame including information requested by AP 1 may be transmitted to AP 1.

To explain the above operation in more detail, in order for a specific AP to use the Multi-AP transmission method, it transmits a request frame to the nearby APs with Multi-AP capability. At this time, the AP transmitting the request frame becomes the master AP, and the AP receiving the request frame becomes the slave AP.

Master AP can acquire information of slave APs through request frame and response frame, and can configure Multi-AP coordination service set.

The Master AP may acquire information about neighboring APs and may transmit a signal including information on the Multi-AP scheme to STAs belonging to the BSS of the Slave AP as well as STAs belonging to its own BSS.

Therefore, the Master AP can transmit and receive information for multi-AP coordination with STAs that do not belong to its BSS.

The master AP may request, to STAs belonging to its own BSS or other BSS (that is, BSS of Slave AP), information on APs preferred by STAs to configure a multi-AP coordination service set among APs other than itself. For example, the master AP may transmit, to the STAs, a request frame requesting information on the AP preferred by the STAs.

Since the Master AP only knows information about the STAs in the BSS composed of itself and APs selected as slave APs among hearable APs, only the corresponding STAs can participate in the Multi-AP coordination setup.

Upon receiving the request frame, the STA may transmit, to the Master AP, information on an AP having good link quality based on link quality measured using a beacon or a management frame transmitted by neighboring APs. That is, the STA may transmit a report signal including information on the preferred AP to the Master AP.

The number of APs that the STA reports to the Master AP may be one or more. When the STA reports one or more APs to the Master AP, the STA may transmit information on the APs listed in the order of link quality to the Master AP.

A report signal, for neighboring APs with good link quality transmitted from the STA to the Master AP, may include information about at least one of a received signal strength indicator (RSSI), a signal to noise ratio (SNR), a signal to interference plus noise ratio (SINR), channel state information (CSI), a channel quality indicator (CQI), related to a link quality measurement result between each AP and the STA itself.

The Master AP, which has received information on the neighboring APs preferred by the STA from the STA, can finally select an AP to participate in Multi-AP coordination among neighboring APs by using the information. The AP selected in this way finally plays the role of a slave AP in Multi-AP coordination. That is, only the finally selected slave APs from among the previously selected slave APs may operate as slave APs. That is, previously selected slave APs may be slave AP candidates, and only finally selected slave APs may be slave APs.

Figure 36:
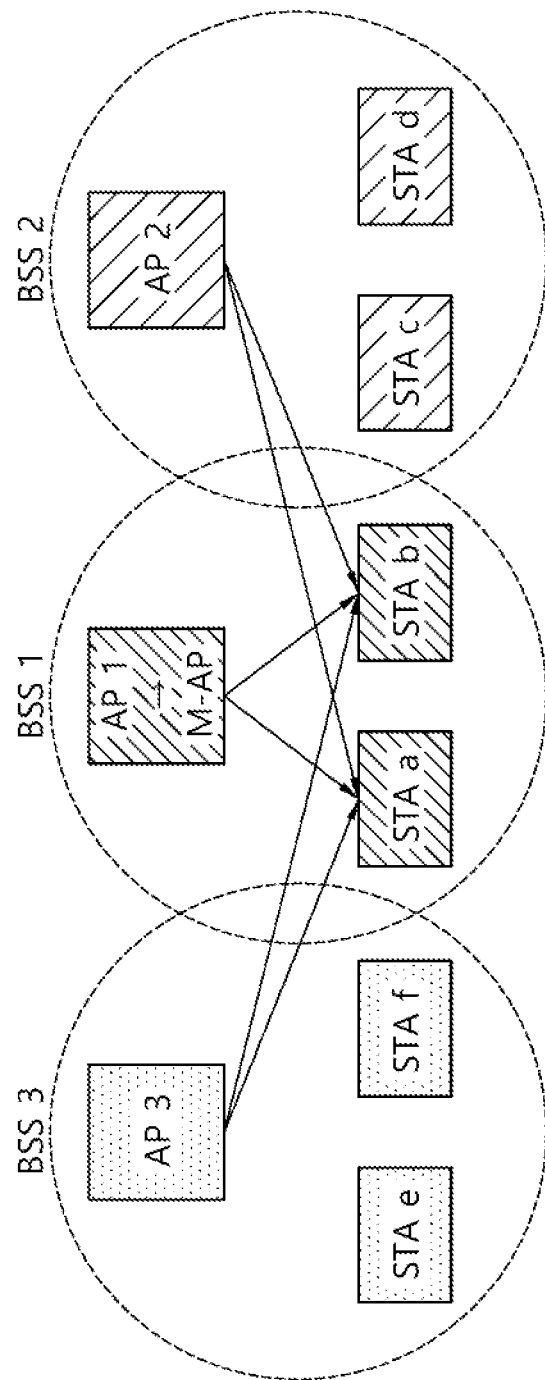
FIG. 36 is a diagram illustrating an example of a network performing both AP and STA-based Multi-AP coordination setup.

FIG. 36 is a diagram illustrating an example of a network performing both AP and STA-based Multi-AP coordination setup.

Referring to FIG. 36, AP 1 may transmit a request frame to the STAs in order to obtain information on what are the preferred APs around for STAs in their BSS, and what is the link quality. AP 1 may perform the role of a Master AP initiating Multi-AP coordination.

STA a and STA b in BSS 1 may know the link quality between themselves and APs (that is, AP2, AP3) based on the beacon and/or management frame transmitted by AP 2 and AP 3.

STA a may know link quality information between STA a and AP 2 and between STA a and AP 3.

STA b may know link quality information between STA b and AP 2 and STA b and AP 3.

Figure 37:
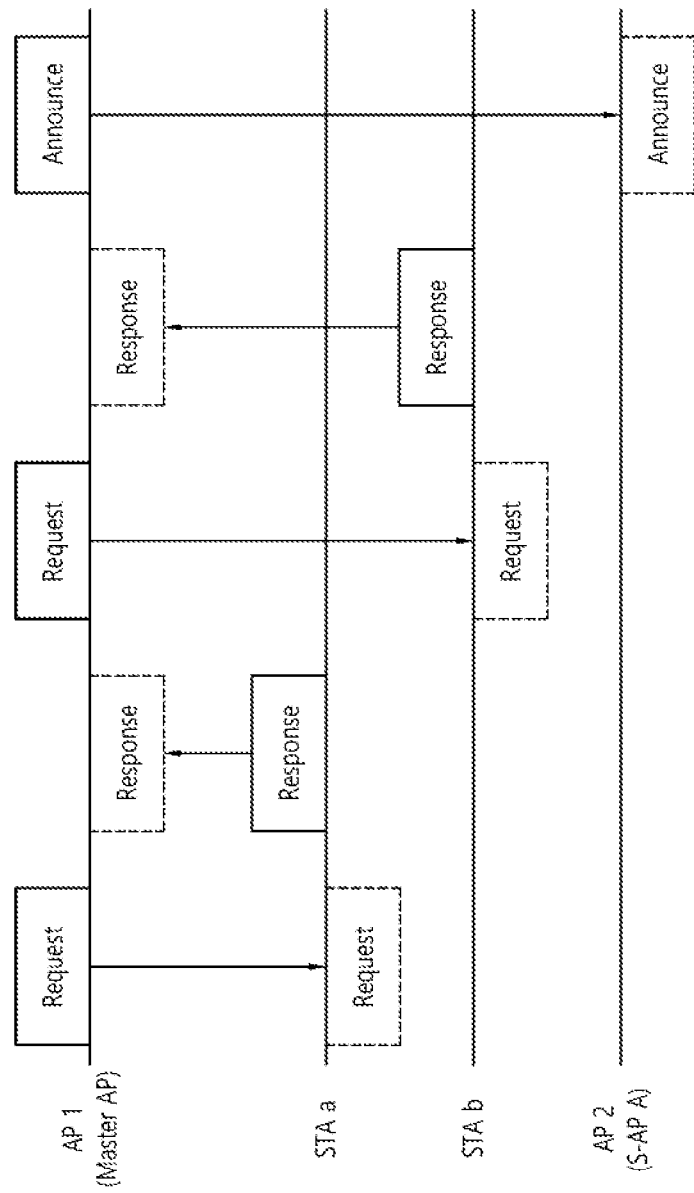
FIG. 37 is a diagram illustrating an embodiment of a method for a Master AP to select a Slave AP.

FIG. 37 is a diagram illustrating an embodiment of a method for a Master AP to select a Slave AP.

Referring to FIG. 37, the Master AP may obtain information on the AP preferred by STAs.

AP 1, which is the master AP, may transmit a signal (request frame) to STA a requesting to report on a nearby AP which is hearable and the link quality from that AP based on the beacon or management frame received by STA a. For example, the Master AP may transmit, to STA a, a request frame requesting to report information on an AP capable of transmitting and receiving data and link quality between STA a and the AP through which the STA a can transmit and receive data.

Information requested through the Request frame (from AP 1 to STA a)
  an AP preferred by STA
  Order of APs preferred by STA
  Link qualities of the APs preferred by the STA (at least one information among an RSSI, an SNR, an SINR, CSI, and a CQI may be included).

Upon receiving the request frame from the master AP, STA a may transmit a response frame to the preferred AP based on the beacon and/or management frame received from the neighboring AP according to the request of the master AP.

Information included in the Response frame (from AP 1 to STA a)
  an AP preferred by STA
  Order of APs preferred by STA
  Link qualities of the APs preferred by the STA (at least one information among an RSSI, an SNR, an SINR, CSI, and a CQI may be included).

AP 1, which is the master AP, may transmit, to STA b, a list of candidate slave APs based on the beacon and/or management frame received by STA b. STA b is requested to report on which AP is hearable from the list of candidate Slave APs, and link quality of the AP, it performs the operation of receiving, from STA b, a response for the corresponding information in the same manner as above. For example, the Master AP may transmit, to STA b, a request frame requesting to report information on AP to which STA b can transmit and receive data, and link quality between STA b and the AP through which the STA b can transmit and receive data. The Master AP may receive a response frame from STA b.

The master AP may know information about APs that are candidates for the multi-AP coordination service set from STA a and STA b, and may finally select a slave AP in consideration of the link quality between each STA and the candidate APs. For example, the master AP may obtain, from STAs a and b, information (for example, AP ID, link quality) about APs that are SAP candidates to perform multi-AP transmission, and may select a Slave AP based on the information.

STA a may respond that it prefers only AP 2 or AP 3, or may respond that it prefers both AP 2 and AP 3. The same is applied for STA b. STA a may transmit information on priorities between preferred APs.

The master AP may select only AP 2 or AP 3 as a slave AP using the response frame transmitted by STA a and STA b, and may select both AP 2 and AP 3 as slave APs.

Figure 38:
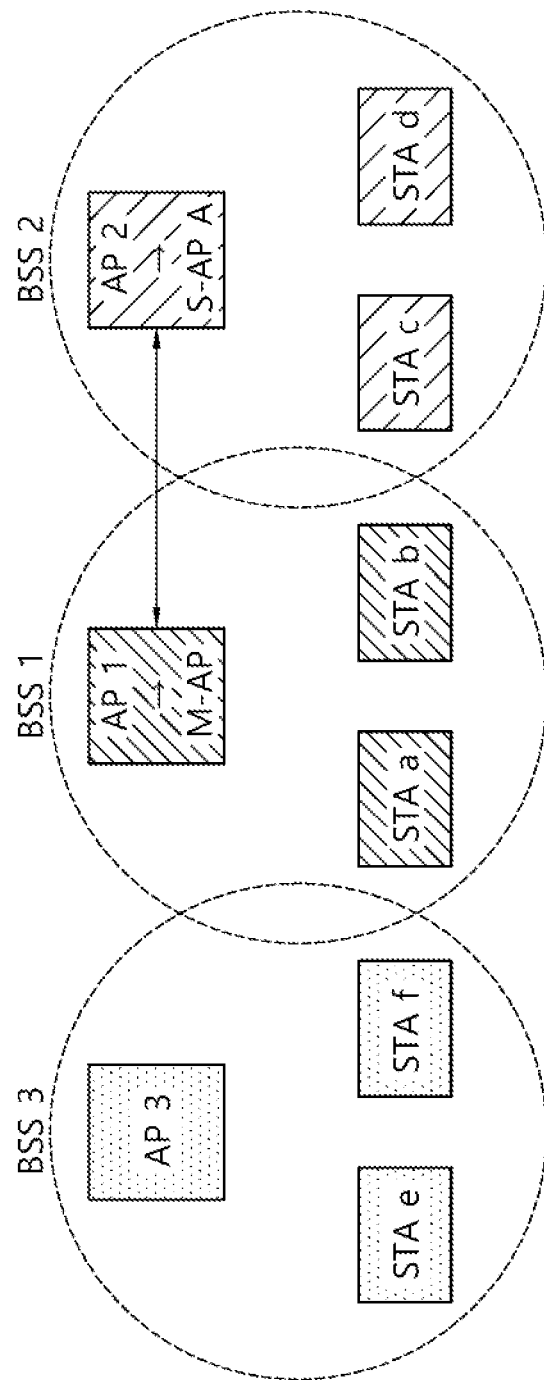
FIG. 38 is a diagram illustrating an example of a network performing both AP and STA-based Multi-AP coordination setup.

FIG. 38 is a diagram illustrating an example of a network performing both AP and STA-based Multi-AP coordination setup.

Referring to FIG. 38, the master AP may select only AP 2 as a slave AP by transmitting an announce frame. Multi-AP coordination service set can be composed of Master AP, which is AP 1, and Slave AP A, which is AP 2.

Information included in the Announce frame (from AP 1 to AP 2)
  Multi-AP group ID
  Identifier of AP 2 (Slave AP A) in Multi-AP coordination:
    AP 2 operates in the Multi-AP coordination environment through the corresponding ID thereafter. For example, AP 2 may be assigned a separate ID in the Multi-AP coordination service set.

Upon receiving the Announce frame, the AP can know that it has been selected as the slave AP.

The master AP may acquire link quality information between the STA and a neighboring AP through the STAs, and may configure a coordination service set using the information.

Therefore, The Master AP can perform efficient Multi-AP transmission, not by randomly engaging all surrounding APs in the Multi-AP coordination service set, and by selectively participating only APs with good link quality reported by the STA in the Multi-AP coordination service set.

The Master AP can configure the Multi-AP coordination service set using the above method, and can perform sounding and data transmission using the Multi-AP with the information obtained in this process.

FIG. 39 is a diagram illustrating an embodiment of a method for a master AP to select an SAP.

The Master AP may select slave APs that can be candidates from among the neighboring APs, may receive information on the slave AP with good link quality among candidate slave APs from the STA, and may finally select the slave AP constituting the Multi-AP coordination. That is, the master AP may determine candidate APs based on the BSS information received from the APs, may receive link quality information about candidate APs from STAs, and may select a slave AP from among the candidate APs based on link quality information.

The procedure of FIG. 39 may be performed in a different order as in FIG. 40.

FIG. 40 is a diagram illustrating an embodiment of a method for a Master AP to select an SAP.

After the Master AP obtains information about which AP is hearable and has a good link quality through the STAs, the Master AP may select an AP that is hearable with the Master AP and suitable for multi-AP transmission among the APs included in the corresponding information, and may designate it as a slave AP. That is, the master AP may receive link quality information from STAs, determine candidate APs based on link quality information, and select a slave AP based on BSS information received from the candidate APs.

4. AP Based Multi-AP Coordination Setup

Figure 41:
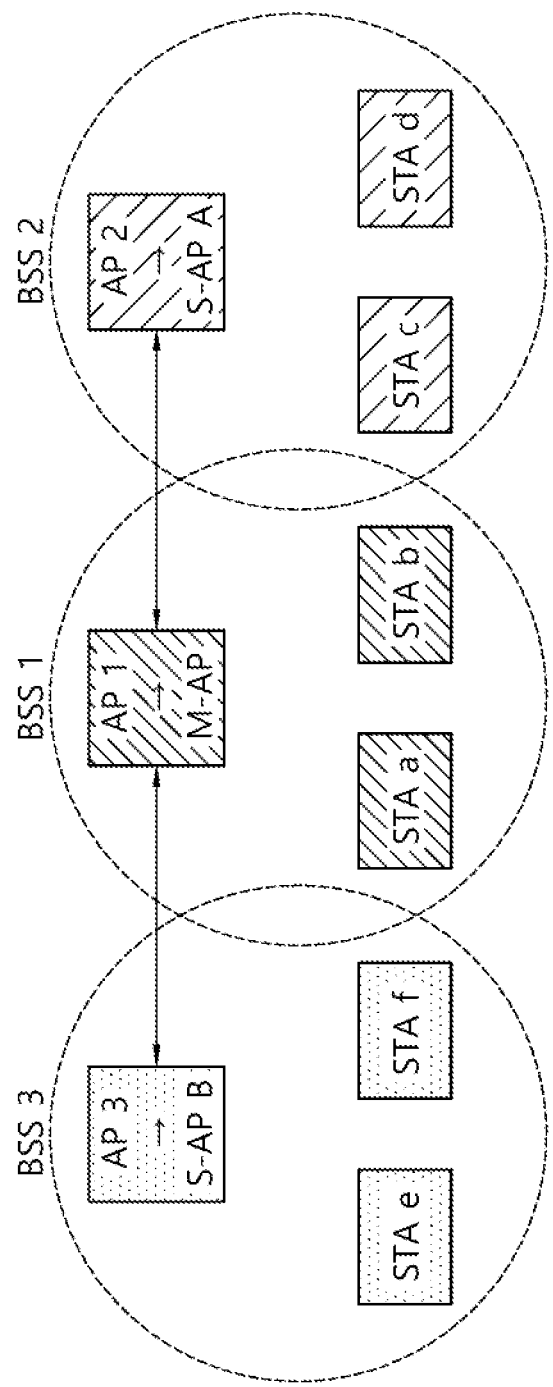
FIG. 41 is a diagram illustrating an example of a network performing AP based Multi-AP coordination setup.

FIG. 41 is a diagram illustrating an example of a network performing AP based Multi-AP coordination setup.

Referring to FIG. 41, each AP may configure a BSS to operate, and STAs within each BSS may perform signal transmission/reception with the AP constituting the BSS. BSS1 may include AP1, STA a, and STA b, BSS2 may include AP2, STA c, STA d, and BSS3 may include AP3, STA e, and STA f.

STAs in the BSS may know which AP has the capability to participate in the Multi-AP coordination set through a beacon frame or a management frame transmitted from an AP of a neighboring BSS (OBSS) other than the BSS to which they belong. For example, STAs in the BSS may obtain information on an AP capable of performing multi-AP transmission through a beacon frame and/or a management frame received from the AP of the OBSS.

For example, AP 1, AP 2, and AP 3 have Multi-AP capability. Through the beacon frame or the management frame, STAs may know whether APs have the multi-AP capability (that is, whether APs can perform multi-AP transmission). Through the Beacon frame or the management frame, STAs (STA a, STA b, STA c, STA d, STA e, STA f) may know whether APs have the multi-AP capability (that is, whether APs can perform multi-AP transmission).

When AP 1 initiates Multi-AP coordination, AP 1 becomes the Master AP. For example, AP 1 that has obtained TXOP may become a master AP.

AP 1 serving as a Master AP may select neighboring APs with Multi-AP capability for multi-AP coordination. For example, the Master AP may select AP2 and AP3. AP 2 may serve as a slave AP A, and AP 3 may serve as a slave AP B.

The Master AP can control Multi-AP transmission by coordinating Slave APs.

Slave AP can participate in Multi-AP transmission under the control of Master AP.

The procedure for the master AP to select the slave AP may be as follows.

Figure 42:
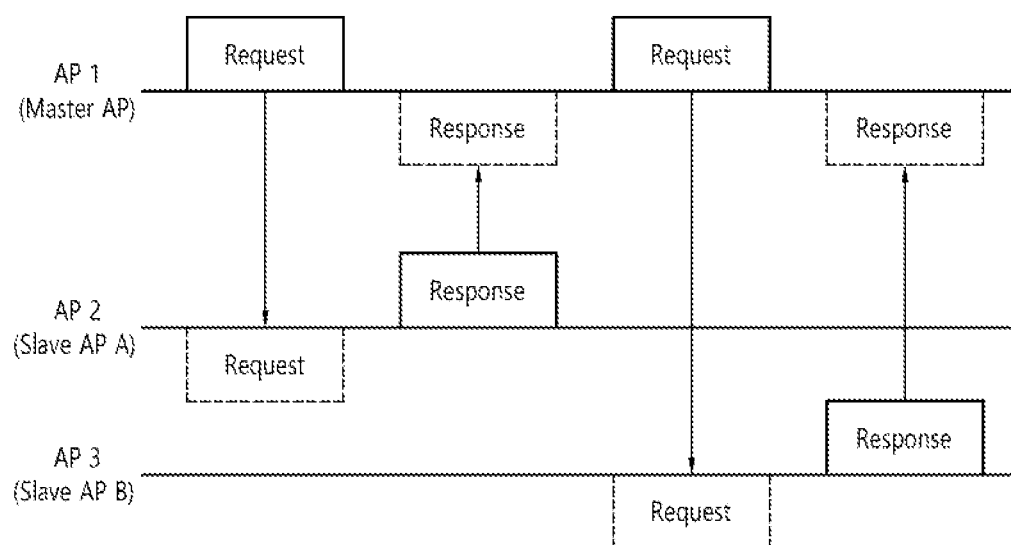
FIG. 42 is a diagram illustrating an example of a method in which a Master AP and a Slave AP perform coordination.

FIG. 42 is a diagram illustrating an example of a method in which a Master AP and a Slave AP perform coordination.

Referring to FIG. 42, AP 1 may operate as a master AP, AP 2 may operate as a slave AP A, and AP 3 may operate as a slave AP B.

The AP 1, which is the master AP, may transmit a request frame to AP 2. The request frame may indicate the fact that AP 2 is a slave AP A. The Master AP may request, through the request frame, information of BSS 2 to which AP 2 belongs.

Upon receiving the request frame transmitted by AP 1, AP 2 can know that it is a slave AP A. AP 2 may transmit, to AP 1, a response frame including information requested by AP 1.

Information included in the request frame (from AP 1 to AP 2)
  Multi-AP group ID
  Identifier of AP 2 (Slave AP A) in Multi-AP coordination:
    AP 2 operates in the Multi-AP coordination environment through the corresponding ID thereafter. For example, AP 2 may be assigned a separate ID in the Multi-AP coordination service set.

BSS information of AP2 requested to AP2: Information on which BSS information the Master AP requests to AP2 may be included. For example, the BSS ID, ID and capability of STAs belonging to the BSS, information on STAs capable of participating in sounding, buffer status in the BSS, MIMO of AP 2, and RF capability may be requested.

Information included in the response frame (from AP 2 to AP 1)

AP 2 may transmit a response frame including information requested by AP 1, which is the master AP.

BSS information of AP2: BSS ID of AP2, identifier and capability of STAs associated with AP2, identifiers of STAs that AP2 intends to transmit data using the Multi-AP technique, identifiers of STAs to participate in the multi-AP sounding process, buffer status of AP 2 and STAs in the corresponding BSS, MIMO of AP 2, RF capability When AP 2 selects a STA to participate in Multi-AP transmission, although the STA has the capability to participate in the Multi-AP transmission scheme, it may refuse to participate in the Multi-AP transmission scheme. Information related to the STA's rejection of participation in multi-AP transmission may be included in the same management frame as the Probe request transmitted by the STA to the AP 2 when the AP 2 configures the BSS.

The AP 1, which is a master AP, may transmit a request frame to AP 3. The request frame may indicate the fact that AP 3 is Slave AP B. The master AP may request, through the request frame, information of BSS 3 to which AP 3 belongs.

Upon receiving the request frame transmitted by AP 1, AP 3 can know that it is Slave AP B. A response frame including information requested by AP 1 may be transmitted to AP 1.

To explain the above operation in more detail, in order for a specific AP to use the Multi-AP transmission method, it transmits a request frame to the nearby APs with Multi-AP capability. At this time, the AP transmitting the request frame becomes the master AP, and the AP receiving the request frame becomes the slave AP.

The Master AP may request the BSS information of the Slave AP to the Slave AP. The slave AP that has received the BSS information request may transmit information on STAs belonging to its own BSS to the master AP. Slave AP can deliver, to Master AP through response frame, information that it wants to perform sounding for the STA that has data to send based on the buffer status of the slave AP, or information that it wants the STA to participate in Multi-AP coordination. For example, the slave AP may transmit BSS information. The BSS information may include information related to a sounding procedure for a STA to which the slave AP intends to transmit data and/or information related to participating in the multi-AP transmission of the STA.

Master AP can acquire information of slave APs through request frame and response frame, and can configure Multi-AP coordination service set.

The Master AP may acquire information about neighboring APs and may transmit a signal including information on the Multi-AP scheme to STAs belonging to the BSS of the Slave AP as well as STAs belonging to its own BSS.

Therefore, the Master AP can transmit and receive information for multi-AP coordination with STAs that do not belong to its BSS.

The Master AP can configure the Multi-AP coordination service set using the above method, and can perform sounding and data transmission using the Multi-AP with the information obtained in this process.

A Multi-AP coordination service set may be configured using the methods 2. to 4. described above, and any Multi-AP transmission scheme may be used based on the information exchanged in this process. The Master AP can perform sounding and data transmission using various types of Multi-AP.

Figure 43:
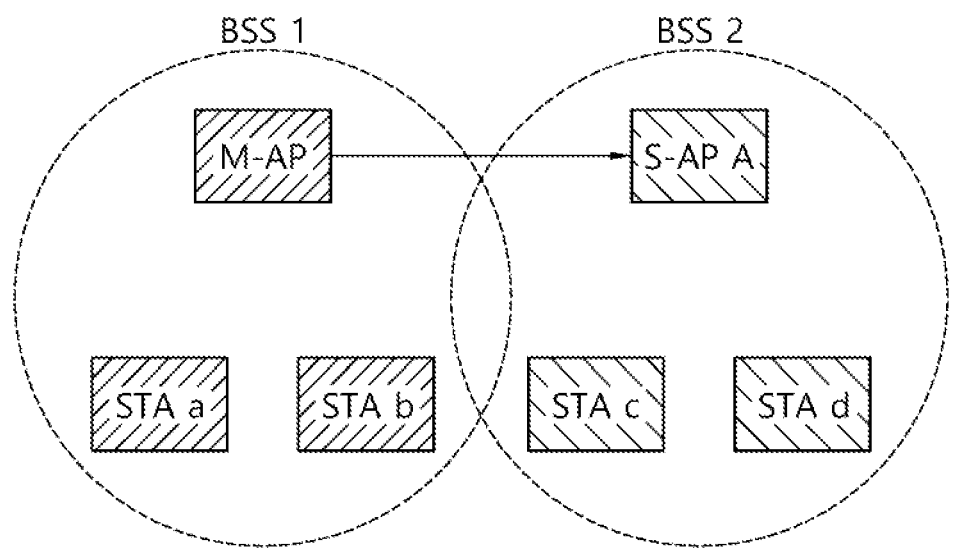
FIGS. 43 to 45 are diagrams illustrating an embodiment of a method for Multi-AP sounding and data transmission.
Figure 44:
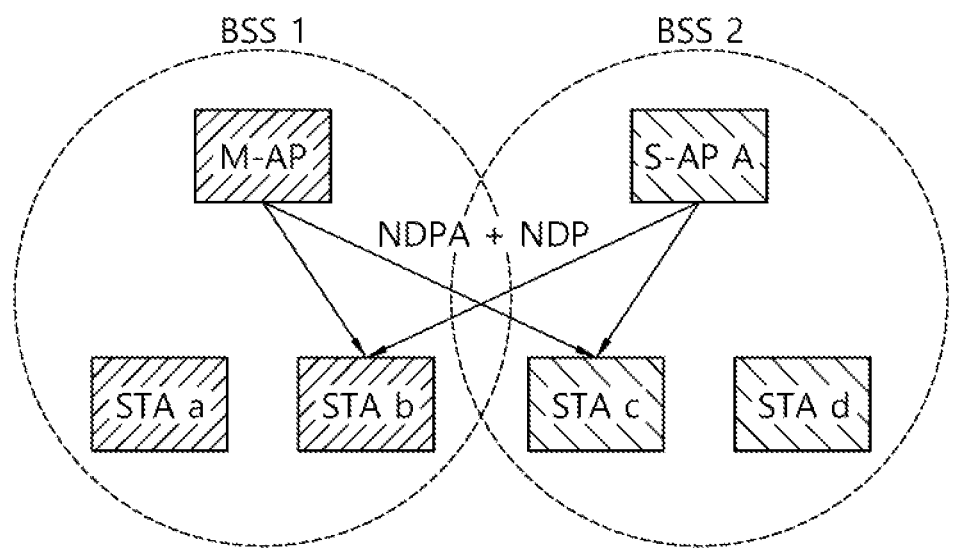
Figure 45:
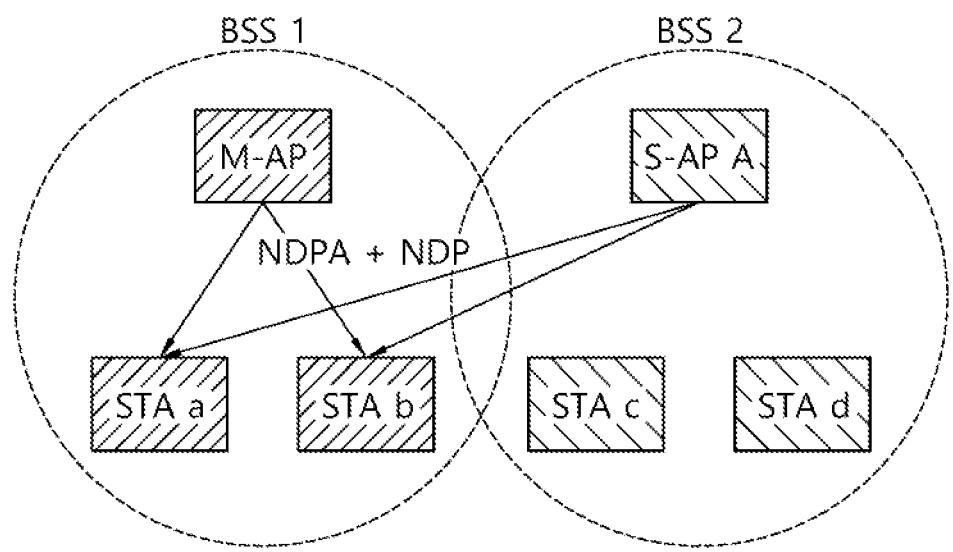

FIGS. 43 to 45 are diagrams illustrating an embodiment of a method for Multi-AP sounding and data transmission.

A. Sounding to Use Coordinated BF Technique and Data Transmission Using Coordinated BF The following Multi-AP sounding can be performed using the Multi-AP coordination service set.

1. The M-AP may inform the S-AP A of the start of Multi-AP sounding.

Referring to FIG. 43, the M-AP may determine which STA belonging to BSS 2 to participate in sounding based on the buffer status (per STA) of S-AP A of BSS 2 and the identifiers of the STAs obtained in the multi-AP coordination setup step.

2. The M-AP and the S-AP A may simultaneously transmit a null data packet announcement (NDPA) frame and a null data packet (NDP) frame.

Referring to FIG. 44, the M-AP may transmit NDPA and NDP to STAs, which it wants to participate in sounding, among STAs belonging to its BSS 1 and BSS 2. There may be one or more STAs selected to participate in Sounding. For example, the M-AP may transmit NDPA+NDP to STA b belonging to BSS 1 and STA c belonging to BSS 2.

S-AP A may transmit NDPA+NDP to STAs indicated by the M-AP among STAs belonging to BSS 1 and BSS 2. There may be one or more STAs selected to participate in Sounding. For example, the S-AP may transmit NDPA+NDP to STA b belonging to BSS 1 and STA c belonging to BSS 2.

3. STA b and STA c may measure the channel using the received NDPA+NDP and feedback the result to the M-AP, S-AP A, or both.

After the sounding performed based on the information acquired in the Multi-AP coordination setup is finished, the following information can be acquired.

Channel state between M-AP and STA b
Channel state between M-AP and STA c
Channel state between S-AP A and STA b
Channel state between S-AP A and STA c Based on the Multi-AP sounding result as above, data transmission using the Multi-AP transmission technique, which is the final purpose, can be performed.

For example, when using data transmission using coordinated BF among Multi-AP transmission methods, M-AP and S-AP A can transmit data at the same time. The M-AP may transmit data to STA b through beamforming while using nulling beamforming to prevent interference to STA c. S-AP A may transmit data by beamforming to STA c while using nulling beamforming to prevent interference to STA b.

Therefore, BSS 1 and BSS 2 can transmit data to STAs belonging to their BSSs at the same time without interfering with each other.

B. Sounding to Use Joint TX Technique and Data Transmission Using Joint TX Technique The following Multi-AP sounding can be performed using the Multi-AP coordination service set.

1. The M-AP may inform the S-AP A of the start of Multi-AP sounding.

Referring to FIG. 43, the M-AP may determine the S-AP to participate in sounding based on the link quality information obtained in the Multi-AP coordination setup step (for example, information about neighboring APs with good link quality with STAs in BSS 1).

2. The M-AP and the S-AP A may simultaneously transmit a null data packet announcement (NDPA) frame and a null data packet (NDP) frame.

Referring to FIG. 45, the M-AP may transmit NDPA and NDP to STAs, which it wants to participate in sounding, among STAs belonging to its BSS 1. There may be one or more STAs selected to participate in sounding. For example, the M-AP may transmit NDPA+NDP to STA A and STA b belonging to BSS 1. For example, the M-AP may instruct the S-AP to perform sounding with STA a and STA b.

For example, S-AP A may transmit NDPA and NDP to STAs indicated by the M-AP (that is, STA a, STA b).

3. STA a and STA b may measure the channel using the received NDPA+NDP and feedback the result to the M-AP.

After the sounding performed based on the information acquired in the Multi-AP coordination setup is finished, the following information can be acquired.

Channel state between M-AP and STA a
Channel state between M-AP and STA b
Channel state between S-AP A and STA a
Channel state between S-AP A and STA b Based on the Multi-AP sounding result as above, data transmission using the Multi-AP transmission technique, which is the final purpose, can be performed.

For example, when data transmission using joint transmission (or Distributed MU MIMO) among the Multi-AP transmission methods is used, the M-AP and S-AP A can transmit data at the same time. Since the M-AP can use the antenna or RF of S-AP A when transmitting data using the joint transmission method, data may be transmitted to STAs a and STA b using more spatial streams than the number of spatial streams that can be used.

Figure 46:
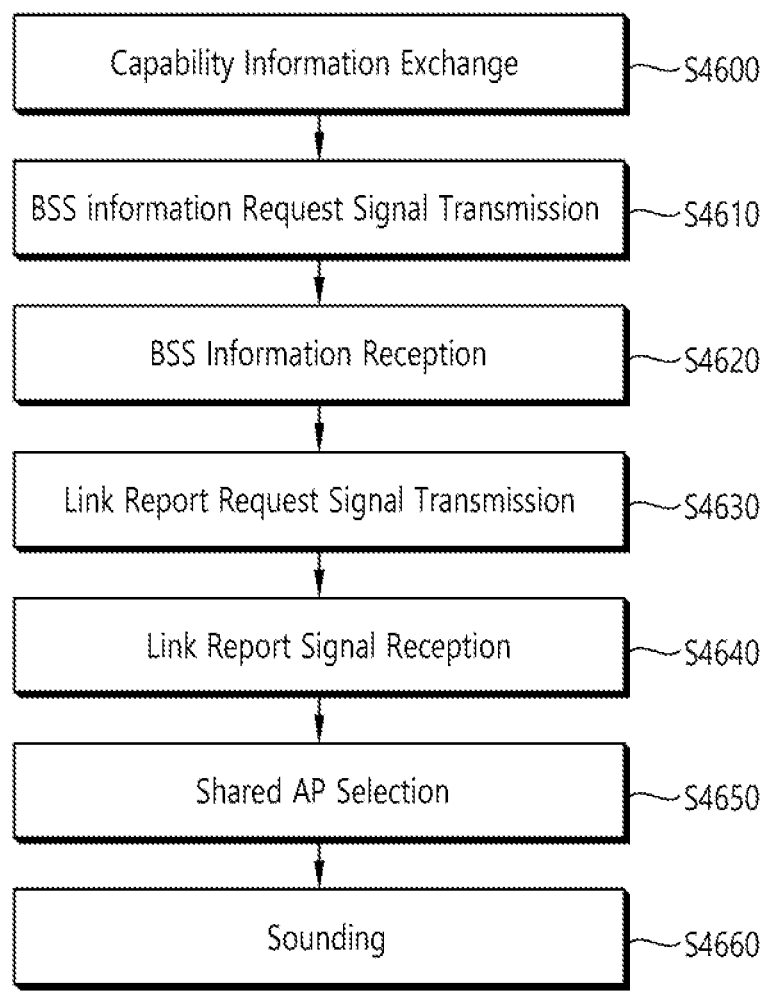
FIG. 46 is a diagram illustrating an embodiment of a sharing AP operation.

FIG. 46 is a diagram illustrating an embodiment of a sharing AP operation.

The operation of the sharing AP described in FIG. 46 may be based on FIGS. 34 to 40. The communication network described in FIG. 46 is based on FIGS. 34, 36, and 38, and AP 1 may be a sharing AP.

Referring to FIG. 46, the sharing AP may exchange capability information (S4600). For example, the sharing AP may be AP 1. For example, the sharing AP may exchange capability information for multi-AP transmission with neighboring APs and/or STAs. For example, the sharing AP may receive first capability information from the first AP and second capability information from the second AP. The first capability information may include information related to the multi-AP transmission capability of the first AP, and the second capability information may include information related to the multi-AP transmission capability of the second AP.

The first and second capability information may include information on at least one multi-AP transmission method supported by each of the first and second APs, among joint transmission, Coordinated beam forming, coordinated orthogonal frequency division multiplexing access (OFDMA), coordinated spatial reuse.

STAs in the BSS may know which AP has the capability to participate in the Multi-AP coordination set through a beacon frame or a management frame transmitted from an AP of a neighboring BSS (OBSS) other than the BSS to which they belong. For example, STAs in the BSS may obtain information on an AP capable of performing multi-AP transmission through a beacon frame and/or a management frame received from the AP of the OBSS.

For example, AP 1, AP 2, and AP 3 have Multi-AP capability. Through the beacon frame or the management frame, STAs may know whether APs have the multi-AP capability (that is, whether APs can perform multi-AP transmission). Through the Beacon frame or the management frame, STAs (STA a, STA b, STA c, STA d, STA e, STA f) may know whether APs have the multi-AP capability (that is, whether APs can perform multi-AP transmission).

The sharing AP may transmit a BSS information request signal (S4610).

For example, the sharing AP may transmit a BSS information request signal to APs having multi-AP capability among neighboring APs.

For example, the sharing AP may transmit a request frame (BSS information request signal) to the AP 2. The request frame (BSS information request signal) may indicate the fact that AP 2 is a shared AP A. The sharing AP may request information of BSS 2 to which AP 2 belongs through a request frame (BSS information request signal).

Upon receiving the request frame (BSS information request signal) transmitted by the sharing AP, AP 2 may transmit a response frame including information requested by the sharing AP to AP 1.

The sharing AP may receive BSS information (response frame) from AP 2 (S4620).

Information included in the Request frame (that is, BSS information request signal) (from sharing AP to AP 2)
Multi-AP group ID
Identifier of AP 2 (shared AP A) in Multi-AP coordination: AP 2 operates in the Multi-AP coordination environment through the corresponding ID thereafter. For example, AP 2 may be assigned a separate ID in the Multi-AP coordination service set.
BSS information of AP2 requested to AP2: Information on which BSS information the Master AP requests to AP2 may be included. For example, the BSS ID, ID and capability of STAs belonging to the BSS, information on STAs capable of participating in sounding, buffer status in the BSS, MIMO of AP 2, and RF capability may be requested.

Information included in the Response frame (from AP 2 to sharing AP)
AP 2 may transmit a response frame including information requested by AP 1, which is the master AP.
BSS information of AP2: BSS ID of AP2, identifier and capability of STAs associated with AP2, identifiers of STAs that AP2 intends to transmit data using the Multi-AP technique, identifiers of STAs to participate in the multi-AP sounding process, buffer status of AP 2 and STAs in the corresponding BSS, MIMO of AP 2, RF capability AP 1, which is a sharing AP, may transmit a request frame (BSS information request signal) to AP 3. The request frame (BSS information request signal) may indicate the fact that AP 3 is a shared AP B. The sharing AP may request information of the BSS 3 to which the AP 3 belongs through a request frame (BSS information request signal).

Upon receiving the request frame transmitted by AP 1, AP 3 can know that it is the shared AP B. A response frame (BSS information) including information requested by AP 1 may be transmitted to AP 1.

To explain the above operation in more detail, in order for a specific AP to use the Multi-AP transmission method, it transmits a request frame to the nearby APs with Multi-AP capability. At this time, the AP transmitting the request frame becomes the sharing AP, and the AP receiving the request frame becomes the shared AP.

The sharing AP can acquire information of the shared APs through the request frame and the response frame, and can configure the Multi-AP coordination service set.

The sharing AP may acquire information about neighboring APs, and may transmit a signal including information on the Multi-AP scheme to STAs belonging to the BSS of the shared AP as well as STAs belonging to its own BSS.

Therefore, the sharing AP can transmit and receive information for multi-AP coordination with STAs that do not belong to its own BSS.

The sharing AP may transmit a link report request signal (S4630). For example, the sharing AP may request, to STAs belonging to its own BSS or other BSS (that is, BSS of the shared AP), information on APs preferred by STAs to configure a multi-AP coordination service set among APs other than itself. For example, the sharing AP may transmit, to the STAs, a request frame (link report request signal) requesting information on the AP preferred by the STAs.

Since the sharing AP only knows information about STAs in the BSS configured by APs selected as shared APs among hearable APs with itself, only the corresponding STAs can participate in the Multi-AP coordination setup.

Upon receiving the request frame (link report request signal), the STA may transmit, to the sharing AP, information (link report signal) on an AP having good link quality based on link quality measured using a beacon or a management frame transmitted by neighboring APs. That is, the STA may transmit a report signal including information on the preferred AP to the sharing AP.

The number of APs that the STA reports to the sharing AP may be one or more. When the STA reports one or more APs to the sharing AP, the STA may transmit information on the APs listed in the order of link quality to the sharing AP.

A report signal, for neighboring APs with good link quality transmitted from the STA to the sharing AP, may include information about at least one of a received signal strength indicator (RSSI), a signal to noise ratio (SNR), a signal to interference plus noise ratio (SINR), channel state information (CSI), a channel quality indicator (CQI), related to a link quality measurement result between each AP and the STA itself.

The sharing AP may receive a link report signal (S4640). For example, the sharing AP, which has received information on the neighboring APs preferred by the STA from the STA, can finally select an AP to participate in Multi-AP coordination among neighboring APs by using the information. The AP selected in this way finally plays the role of a shared AP in Multi-AP coordination. That is, only the finally selected shared APs from among the previously selected shared APs may operate as shared APs. That is, previously selected shared APs may be shared AP candidates, and only finally selected shared APs may be shared APs. For example, the sharing AP may transmit an announcement frame to the finally selected shared APs.

AP 1 (sharing AP) may transmit a request frame to the STAs in order to obtain information on what are the preferred APs around for STAs in their BSS, and what is the link quality. AP 1 may perform the role of a sharing AP initiating Multi-AP coordination.

STA a and STA b in BSS 1 may know the link quality between themselves and APs (that is, AP2, AP3) based on the beacon and/or management frame transmitted by AP 2 and AP 3.

STA a may know link quality information between STA a and AP 2 and between STA a and AP 3.

STA b may know link quality information between STA b and AP 2 and STA b and AP 3.

The sharing AP may acquire information on the AP preferred by STAs.

AP 1, which is the sharing AP, may transmit a signal (request frame) to STA a requesting to report on a nearby AP which is hearable and the link quality from that AP based on the beacon or management frame received by STA a. For example, the sharing AP may transmit, to STA a, a request frame (link report request signal) requesting to report information on an AP capable of transmitting and receiving data and link quality between STA a and the AP through which the STA a can transmit and receive data.

Information requested through the request frame (link report request signal) (from AP 1 to STA a)
 an AP preferred by STA
 Order of APs preferred by STA
 Link qualities of the APs preferred by the STA (at least one information among an RSSI, an SNR, an SINR, CSI, and a CQI may be included).

Upon receiving the request frame from the sharing AP, STA a may transmit a response frame to the preferred AP based on the beacon and/or management frame received from the neighboring AP according to the request of the sharing AP.

Information included in the Response frame (from AP 1 to STA a)
 an AP preferred by STA
 Order of APs preferred by STA
 Link qualities of the APs preferred by the STA (at least one information among an RSSI, an SNR, an SINR, CSI, and a CQI may be included).

AP 1, which is the sharing AP, may transmit, to STA b, a list of candidate shared APs based on the beacon and/or management frame received by STA b. STA b is requested to report on which AP is hearable from the list of candidate shared APs, and link quality of the AP, it performs the operation of receiving, from STA b, a response for the corresponding information in the same manner as above. For example, the sharing AP may transmit, to STA b, a request frame requesting to report information on AP to which STA b can transmit and receive data, and link quality between STA b and the AP through which the STA b can transmit and receive data. The sharing AP may receive a response frame from STA b.

The sharing AP may select a shared AP (S4650). For example, the sharing AP may know information about APs that are candidates for the multi-AP coordination service set from STA a and STA b, and may finally select a shared AP in consideration of the link quality between each STA and the candidate APs. For example, the sharing AP may obtain, from STAs a and b, information (for example, AP ID, link quality) about APs that are SAP candidates to perform multi-AP transmission, and may select a shared AP based on the information.

STA a may respond that it prefers only AP 2 or AP 3, or may respond that it prefers both AP 2 and AP 3. The same is applied for STA b. STA a may transmit information on priorities between preferred APs.

The sharing AP may select only AP 2 or AP 3 as the shared AP using the response frame transmitted by STA a and STA b, and may select both AP 2 and AP 3 as the shared AP.

The sharing AP can select only AP 2 as the shared AP by sending an announce frame. Multi-AP coordination service set may be composed of AP 1 which is a sharing AP and AP 2 which is a shared AP A.

Information included in the Announce frame (from AP 1 to AP 2)

Multi-AP group ID

Identifier of AP 2 (shared AP A) in Multi-AP coordination: AP 2 operates in the Multi-AP coordination environment through the corresponding ID thereafter. For example, AP 2 may be assigned a separate ID in the Multi-AP coordination service set.

Upon receiving the Announce frame, the AP can know that it has been selected as the shared AP.

The sharing AP may acquire link quality information between the STA and a neighboring AP through the STAs, and may configure a coordination service set using the information.

Therefore, the sharing AP can perform efficient Multi-AP transmission, not by randomly engaging all surrounding APs in the Multi-AP coordination service set, and by selectively participating only APs with good link quality reported by the STA in the Multi-AP coordination service set.

The sharing AP can configure the Multi-AP coordination service set using the above method, and can perform sounding and data transmission using the Multi-AP with the information obtained in this process.

For example, the sharing AP may select shared APs that can be candidates from among the neighboring APs, may receive information on the shared AP with good link quality among candidate shared APs from the STA, and may finally select the shared AP constituting the Multi-AP coordination. That is, the sharing AP may determine candidate APs based on the BSS information received from the APs, may receive link quality information about candidate APs from STAs, and may select a shared AP from among the candidate APs based on link quality information.

Otherwise, for example, after the sharing AP obtains information about which AP is hearable and has a good link quality through the STAs, the sharing AP may select an AP that is hearable with the sharing AP and suitable for multi-AP transmission among the APs included in the corresponding information, and may designate it as a shared AP. That is, the sharing AP may receive link quality information from STAs, determine candidate APs based on link quality information, and select a shared AP based on BSS information received from the candidate APs.

The sharing AP may perform sounding (S4660). The sounding procedure may be performed based on FIGS. 43 to 45.

A. Sounding to Use Coordinated BF Technique and Data Transmission Using Coordinated BF The following Multi-AP sounding can be performed using the Multi-AP coordination service set.

1. The M-AP may inform the S-AP A of the start of Multi-AP sounding.

Referring to FIG. 43, the M-AP may determine which STA belonging to BSS 2 to participate in sounding based on the buffer status (per STA) of S-AP A of BSS 2 and the identifiers of the STAs obtained in the multi-AP coordination setup step.

2. The M-AP and the S-AP A may simultaneously transmit a null data packet announcement (NDPA) frame and a null data packet (NDP) frame.

Referring to FIG. 44, the M-AP may transmit NDPA and NDP to STAs, which it wants to participate in sounding, among STAs belonging to its BSS 1 and BSS 2. There may be one or more STAs selected to participate in Sounding. For example, the M-AP may transmit NDPA+NDP to STA b belonging to BSS 1 and STA c belonging to BSS 2.

S-AP A may transmit NDPA+NDP to STAs indicated by the M-AP among STAs belonging to BSS 1 and BSS 2. There may be one or more STAs selected to participate in Sounding. For example, the S-AP may transmit NDPA+NDP to STA b belonging to BSS 1 and STA c belonging to BSS 2.

3. STA b and STA c may measure the channel using the received NDPA+NDP and feedback the result to the M-AP, S-AP A, or both.

After the sounding performed based on the information acquired in the Multi-AP coordination setup is finished, the following information can be acquired.

Channel state between M-AP and STA b
Channel state between M-AP and STA c
Channel state between S-AP A and STA b
Channel state between S-AP A and STA c Based on the Multi-AP sounding result as above, data transmission using the Multi-AP transmission technique, which is the final purpose, can be performed.

For example, when using data transmission using coordinated BF among Multi-AP transmission methods, M-AP and S-AP A can transmit data at the same time. The M-AP may transmit data to STA b through beamforming while using nulling beamforming to prevent interference to STA c. S-AP A may transmit data by beamforming to STA c while using nulling beamforming to prevent interference to STA b.

Therefore, BSS 1 and BSS 2 can transmit data to STAs belonging to their BSSs at the same time without interfering with each other.

B. Sounding to Use Joint TX Technique and Data Transmission Using Joint TX Technique The following Multi-AP sounding can be performed using the Multi-AP coordination service set.

1. The M-AP may inform the S-AP A of the start of Multi-AP sounding.

Referring to FIG. 43, the M-AP may determine the S-AP to participate in sounding based on the link quality information obtained in the Multi-AP coordination setup step (for example, information about neighboring APs with good link quality with STAs in BSS 1).

2. The M-AP and the S-AP A may simultaneously transmit a null data packet announcement (NDPA) frame and a null data packet (NDP) frame.

Referring to FIG. 45, the M-AP may transmit NDPA and NDP to STAs, which it wants to participate in sounding, among STAs belonging to its BSS 1. There may be one or more STAs selected to participate in sounding. For example, the M-AP may transmit NDPA+NDP to STA A and STA b belonging to BSS 1. For example, the M-AP may instruct the S-AP to perform sounding with STA a and STA b.

For example, S-AP A may transmit NDPA and NDP to STAs indicated by the M-AP (that is, STA a, STA b).

3. STA a and STA b may measure the channel using the received NDPA+NDP and feedback the result to the M-AP.

After the sounding performed based on the information acquired in the Multi-AP coordination setup is finished, the following information can be acquired.

Channel state between M-AP and STA a
Channel state between M-AP and STA b
Channel state between S-AP A and STA a
Channel state between S-AP A and STA b Based on the Multi-AP sounding result as above, data transmission using the Multi-AP transmission technique, which is the final purpose, can be performed.

For example, when data transmission using joint transmission (or Distributed MU MIMO) among the Multi-AP transmission methods is used, the M-AP and S-AP A can transmit data at the same time. Since the M-AP can use the antenna or RF of S-AP A when transmitting data using the joint transmission method, data may be transmitted to STAs a and STA b using more spatial streams than the number of spatial streams that can be used.

Figure 47:
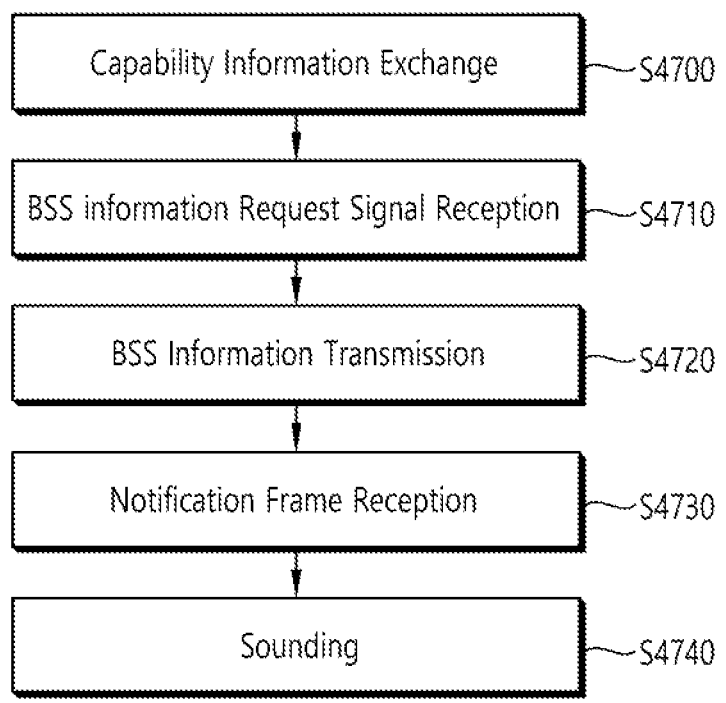
FIG. 47 is a diagram illustrating an embodiment of a shared AP operation.

FIG. 47 is a diagram illustrating an embodiment of a shared AP operation.

The operation of the shared AP described in FIG. 47 may be based on FIGS. 34 to 40. The communication network described in FIG. 47 is based on FIGS. 34, 36, and 38, and AP 2 or AP 3 may be a shared AP.

Referring to FIG. 47, the shared AP may exchange capability information £S47001. For example, the sharing AP may be AP 1. For example, the sharing AP may exchange capability information for multi-AP transmission with neighboring APs and/or STAs. For example, the sharing AP may receive first capability information from the first AP and second capability information from the second AP. The first capability information may include information related to the multi-AP transmission capability of the first AP, and the second capability information may include information related to the multi-AP transmission capability of the second AP.

The first and second capability information may include information on at least one multi-AP transmission method, supported by each of the first and second APs, among joint transmission, Coordinated beam forming, coordinated orthogonal frequency division multiplexing access (OFDMA), coordinated spatial reuse.

STAs in the BSS may know which AP has the capability to participate in the Multi-AP coordination set through a beacon frame or a management frame transmitted from an AP of a neighboring BSS (OBSS) other than the BSS to which they belong. For example, STAs in the BSS may obtain information on an AP capable of performing multi-AP transmission through a beacon frame and/or a management frame received from the AP of the OBSS.

For example, AP 1, AP 2, and AP 3 have Multi-AP capability. Through the beacon frame or the management frame, STAs may know whether APs have the multi-AP capability (that is, whether APs can perform multi-AP transmission). Through the Beacon frame or the management frame, STAs (STA a, STA b, STA c, STA d, STA e, STA f) may know whether APs have the multi-AP capability (that is, whether APs can perform multi-AP transmission).

The shared AP may receive a BSS information request signal (S4710).

For example, the sharing AP may transmit a BSS information request signal to APs having multi-AP capability among neighboring APs.

For example, the sharing AP may transmit a request frame (BSS information request signal) to the AP 2. The request frame (BSS information request signal) may indicate the fact that AP 2 is a shared AP A. The sharing AP may request information of BSS 2 to which AP 2 belongs through a request frame (BSS information request signal).

The shared AP may transmit BSS information (S4720). For example, upon receiving the request frame (BSS information request signal) transmitted by the sharing AP, AP 2 may transmit, to AP 1, a response frame including information requested by the sharing AP.

The sharing AP may receive BSS information (response frame) from AP 2

Information included in the Request frame (that is, BSS information request signal) (from sharing AP to AP 2)

Multi-AP group ID

Identifier of AP 2 (shared AP A) in Multi-AP coordination: AP 2 operates in the Multi-AP coordination environment through the corresponding ID thereafter. For example, AP 2 may be assigned a separate ID in the Multi-AP coordination service set.

BSS information of AP2 requested to AP2: Information on which BSS information the Master AP requests to AP2 may be included. For example, the BSS ID, ID and capability of STAs belonging to the BSS, information on STAs capable of participating in sounding, buffer status in the BSS, MIMO of AP 2, and RF capability may be requested.

Information included in the Response frame (from AP 2 to sharing AP)

AP 2 may transmit a response frame including information requested by AP 1, which is the master AP.

BSS information of AP2: BSS ID of AP2, identifier and capability of STAs associated with AP2, identifiers of STAs that AP2 intends to transmit data using the Multi-AP technique, identifiers of STAs to participate in the multi-AP sounding process, buffer status of AP 2 and STAs in the corresponding BSS, MIMO of AP 2, RF capability AP 1, which is a sharing AP, may transmit a request frame (BSS information request signal) to AP 3. The request frame (BSS information request signal) may indicate the fact that AP 3 is a shared AP B. The sharing AP may request information of the BSS 3 to which the AP 3 belongs through a request frame (BSS information request signal).

Upon receiving the request frame transmitted by AP 1, AP 3 can know that it is the shared AP B. A response frame (BSS information) including information requested by AP 1 may be transmitted to AP 1.

To explain the above operation in more detail, in order for a specific AP to use the Multi-AP transmission method, it transmits a request frame to the nearby APs with Multi-AP capability. At this time, the AP transmitting the request frame becomes the sharing AP, and the AP receiving the request frame becomes the shared AP.

The sharing AP can acquire information of the shared APs through the request frame and the response frame, and can configure the Multi-AP coordination service set.

The sharing AP may acquire information about neighboring APs, and may transmit a signal including information on the Multi-AP scheme to STAs belonging to the BSS of the shared AP as well as STAs belonging to its own BSS.

Therefore, the sharing AP can transmit and receive information for multi-AP coordination with STAs that do not belong to its own BSS.

The sharing AP may transmit a link report request signal. For example, the sharing AP may request, to STAs belonging to its own BSS or other BSS (that is, BSS of the shared AP), information on APs preferred by STAs to configure a multi-AP coordination service set among APs other than itself. For example, the sharing AP may transmit, to the STAs, a request frame (link report request signal) requesting information on the AP preferred by the STAs.

Since the sharing AP only knows information about STAs in the BSS configured by APs selected as shared APs among hearable APs with itself, only the corresponding STAs can participate in the Multi-AP coordination setup.

Upon receiving the request frame (link report request signal), the STA may transmit, to the sharing AP, information (link report signal) on an AP having good link quality based on link quality measured using a beacon or a management frame transmitted by neighboring APs. That is, the STA may transmit a report signal including information on the preferred AP to the sharing AP.

The number of APs that the STA reports to the sharing AP may be one or more. When the STA reports one or more APs to the sharing AP, the STA may transmit information on the APs listed in the order of link quality to the sharing AP.

A report signal, for neighboring APs with good link quality transmitted from the STA to the sharing AP, may include information about at least one of a received signal strength indicator (RSSI), a signal to noise ratio (SNR), a signal to interference plus noise ratio (SINR), channel state information (CSI), a channel quality indicator (CQI), related to a link quality measurement result between each AP and the STA itself.

The sharing AP may receive a link report signal. For example, the sharing AP, which has received information on the neighboring APs preferred by the STA from the STA, can finally select an AP to participate in Multi-AP coordination among neighboring APs by using the information. The AP selected in this way finally plays the role of a shared AP in Multi-AP coordination. That is, only the finally selected shared APs from among the previously selected shared APs may operate as shared APs. That is, previously selected shared APs may be shared AP candidates, and only finally selected shared APs may be shared APs. For example, the sharing AP may transmit an announcement frame to the finally selected shared APs.

AP 1 (sharing AP) may transmit a request frame to the STAs in order to obtain information on what are the preferred APs around for STAs in their BSS, and what is the link quality. AP 1 may perform the role of a sharing AP initiating Multi-AP coordination.

STA a and STA b in BSS 1 may know the link quality between themselves and APs (that is, AP2, AP3) based on the beacon and/or management frame transmitted by AP 2 and AP 3.

STA a may know link quality information between STA a and AP 2 and between STA a and AP 3.

STA b may know link quality information between STA b and AP 2 and STA b and AP 3.

The sharing AP may acquire information on the AP preferred by STAs.

AP 1, which is the sharing AP, may transmit a signal (request frame) to STA a requesting to report on a nearby AP which is hearable and the link quality from that AP based on the beacon or management frame received by STA a. For example, the sharing AP may transmit, to STA a, a request frame (link report request signal) requesting to report information on an AP capable of transmitting and receiving data and link quality between STA a and the AP through which the STA a can transmit and receive data.

Information requested through the request frame (link report request signal) (from AP 1 to STA a)
  an AP preferred by STA
  Order of APs preferred by STA
  Link qualities of the APs preferred by the STA (at least one information among an RSSI, an SNR, an SINR, CSI, and a CQI may be included).

Upon receiving the request frame from the sharing AP, STA a may transmit a response frame to the preferred AP based on the beacon and/or management frame received from the neighboring AP according to the request of the sharing AP.

Information included in the Response frame (from AP 1 to STA a)
  an AP preferred by STA
  Order of APs preferred by STA
  Link qualities of the APs preferred by the STA (at least one information among an RSSI, an SNR, an SINR, CSI, and a CQI may be included).

AP 1, which is the sharing AP, may transmit, to STA b, a list of candidate shared APs based on the beacon and/or management frame received by STA b. STA b is requested to report on which AP is hearable from the list of candidate shared APs, and link quality of the AP, it performs the operation of receiving, from STA b, a response for the corresponding information in the same manner as above. For example, the sharing AP may transmit, to STA b, a request frame requesting to report information on AP to which STA b can transmit and receive data, and link quality between STA b and the AP through which the STA b can transmit and receive data. The sharing AP may receive a response frame from STA b.

The sharing AP may select a shared AP. For example, the sharing AP may know information about APs that are candidates for the multi-AP coordination service set from STA a and STA b, and may finally select a shared AP in consideration of the link quality between each STA and the candidate APs. For example, the sharing AP may obtain, from STAs a and b, information (for example, AP ID, link quality) about APs that are SAP candidates to perform multi-AP transmission, and may select a shared AP based on the information.

STA a may respond that it prefers only AP 2 or AP 3, or may respond that it prefers both AP 2 and AP 3. The same is applied for STA b. STA a may transmit information on priorities between preferred APs.

The sharing AP may select only AP 2 or AP 3 as the shared AP using the response frame transmitted by STA a and STA b, and may select both AP 2 and AP 3 as the shared AP.

The sharing AP can select only AP 2 as the shared AP by sending an announce frame. Multi-AP coordination service set may be composed of AP 1 which is a sharing AP and AP 2 which is a shared AP A.

The shared AP may receive a notification frame (S4730).

Information included in the Announce frame (from AP 1 to AP 2)
  Multi-AP group ID
  Identifier of AP 2 (shared AP A) in Multi-AP coordination: AP 2 operates in the Multi-AP coordination environment through the corresponding ID thereafter. For example, AP 2 may be assigned a separate ID in the Multi-AP coordination service set.

Upon receiving the Announce frame, the AP can know that it has been selected as the shared AP.

The sharing AP may acquire link quality information between the STA and a neighboring AP through the STAs, and may configure a coordination service set using the information.

Therefore, the sharing AP can perform efficient Multi-AP transmission, not by randomly engaging all surrounding APs in the Multi-AP coordination service set, and by selectively participating only APs with good link quality reported by the STA in the Multi-AP coordination service set.

The sharing AP can configure the Multi-AP coordination service set using the above method, and can perform sounding and data transmission using the Multi-AP with the information obtained in this process.

For example, the sharing AP may select shared APs that can be candidates from among the neighboring APs, may receive information on the shared AP with good link quality among candidate shared APs from the STA, and may finally select the shared AP constituting the Multi-AP coordination. That is, the sharing AP may determine candidate APs based on the BSS information received from the APs, may receive link quality information about candidate APs from STAs, and may select a shared AP from among the candidate APs based on link quality information.

Otherwise, for example, after the sharing AP obtains information about which AP is hearable and has a good link quality through the STAs, the sharing AP may select an AP that is hearable with the sharing AP and suitable for multi-AP transmission among the APs included in the corresponding information, and may designate it as a shared AP. That is, the sharing AP may receive link quality information from STAs, determine candidate APs based on link quality information, and select a shared AP based on BSS information received from the candidate APs.

The shard AP may perform sounding (S4740). The sounding procedure may be performed based on FIGS. 43 to 45.

A. Sounding to Use Coordinated BF Technique and Data Transmission Using Coordinated BF The following Multi-AP sounding can be performed using the Multi-AP coordination service set.

1. The M-AP may inform the S-AP A of the start of Multi-AP sounding.

Referring to FIG. 43, the M-AP may determine which STA belonging to BSS 2 to participate in sounding based on the buffer status (per STA) of S-AP A of BSS 2 and the identifiers of the STAs obtained in the multi-AP coordination setup step.

2. The M-AP and the S-AP A may simultaneously transmit a null data packet announcement (NDPA) frame and a null data packet (NDP) frame.

Referring to FIG. 44, the M-AP may transmit NDPA and NDP to STAs, which it wants to participate in sounding, among STAs belonging to its BSS 1 and BSS 2. There may be one or more STAs selected to participate in Sounding. For example, the M-AP may transmit NDPA+NDP to STA b belonging to BSS 1 and STA c belonging to BSS 2.

S-AP A may transmit NDPA+NDP to STAs indicated by the M-AP among STAs belonging to BSS 1 and BSS 2. There may be one or more STAs selected to participate in Sounding. For example, the S-AP may transmit NDPA+NDP to STA b belonging to BSS 1 and STA c belonging to BSS 2.

3. STA b and STA c may measure the channel using the received NDPA+NDP and feedback the result to the M-AP, S-AP A, or both.

After the sounding performed based on the information acquired in the Multi-AP coordination setup is finished, the following information can be acquired.

Channel state between M-AP and STA b
Channel state between M-AP and STA c
Channel state between S-AP A and STA b
Channel state between S-AP A and STA c Based on the Multi-AP sounding result as above, data transmission using the Multi-AP transmission technique, which is the final purpose, can be performed.

For example, when using data transmission using coordinated BF among Multi-AP transmission methods, M-AP and S-AP A can transmit data at the same time. The M-AP may transmit data to STA b through beamforming while using nulling beamforming to prevent interference to STA c. S-AP A may transmit data by beamforming to STA c while using nulling beamforming to prevent interference to STA b.

Therefore, BSS 1 and BSS 2 can transmit data to STAs belonging to their BSSs at the same time without interfering with each other.

B. Sounding to Use Joint TX Technique and Data Transmission Using Joint TX Technique The following Multi-AP sounding can be performed using the Multi-AP coordination service set.

1. The M-AP may inform the S-AP A of the start of Multi-AP sounding.

Referring to FIG. 43, the M-AP may determine the S-AP to participate in sounding based on the link quality information obtained in the Multi-AP coordination setup step (for example, information about neighboring APs with good link quality with STAs in BSS 1).

2. The M-AP and the S-AP A may simultaneously transmit a null data packet announcement (NDPA) frame and a null data packet (NDP) frame.

Referring to FIG. 45, the M-AP may transmit NDPA and NDP to STAs, which it wants to participate in sounding, among STAs belonging to its BSS 1. There may be one or more STAs selected to participate in sounding. For example, the M-AP may transmit NDPA+NDP to STA A and STA b belonging to BSS 1. For example, the M-AP may instruct the S-AP to perform sounding with STA a and STA b.

For example, S-AP A may transmit NDPA and NDP to STAs indicated by the M-AP (that is, STA a, STA b).

3. STA a and STA b may measure the channel using the received NDPA+NDP and feedback the result to the M-AP.

After the sounding performed based on the information acquired in the Multi-AP coordination setup is finished, the following information can be acquired.

Channel state between M-AP and STA a
Channel state between M-AP and STA b
Channel state between S-AP A and STA a
Channel state between S-AP A and STA b Based on the Multi-AP sounding result as above, data transmission using the Multi-AP transmission technique, which is the final purpose, can be performed.

For example, when data transmission using joint transmission (or Distributed MU MIMO) among the Multi-AP transmission methods is used, the M-AP and S-AP A can transmit data at the same time. Since the M-AP can use the antenna or RF of S-AP A when transmitting data using the joint transmission method, data may be transmitted to STAs a and STA b using more spatial streams than the number of spatial streams that can be used.

Some of the detailed steps shown in the example of FIGS. 45 and 46 may be omitted. In addition to the steps shown in FIGS. 45 and 46, other steps may be added, and the order of the steps may vary. Some of the above steps may have their own technical meaning.

The technical features of the present specification described above may be applied to various devices and methods. For example, the above-described technical features of the present specification may be performed/supported through the apparatus of FIGS. 1 and/or 19. For example, the above-described technical features of the present specification may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 19. For example, an apparatus herein may include a memory and a processor operatively coupled to the memory. The processor may be configured to receive, from a first AP, basic service set (BSS)

information of the first AP, and receive, from a second AP, BSS information of the second AP; receive, from a station (STA), a link report signal including link quality information between the first AP and the STA and link quality information between the second AP and the STA; and select the first AP as a shared AP based on the first and second capability information and the link quality information.

The technical features of the present specification may be implemented based on a computer readable medium (CRM). For example, the CRM proposed by the present specification includes an instruction based on being executed by at least one processor of a first STA (station) of a wireless local area network system. In at least one computer readable medium may store instructions that perform operations comprising: receiving, from a first AP, basic service set (BSS) information of the first AP, and receiving, from a second AP, BSS information of the second AP; receiving, from a station (STA), a link report signal including link quality information between the first AP and the STA and link quality information between the second AP and the STA; and selecting the first AP as a shared AP based on the first and second capability information and the link quality information. The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:
1. A method performed in a wireless local area network system, the method comprising:
receiving, by a sharing access point (AP) from a first AP, basic service set (BSS) information of the first AP;
receiving, by the sharing AP from a second AP, BSS information of the second AP;
receiving, by the sharing AP from a station (STA), a physical protocol data unit (PPDU) comprising a legacy signal (L-SIG) field, a repeated legacy signal (RL-SIG) field which is a repeat of the L-SIG field, a control signal field carrying information for interpreting the PPDU, and a data field,
wherein the RL-SIG field is contiguous to the L-SIG field, and the control signal field is contiguous to the RL-SIG field,
wherein the L-SIG field includes a length field which is set to a value satisfying a condition that a remainder is zero when the length field is divided by three (3),
wherein the control signal field includes a subfield related to a physical version of the PPDU and having a length of three bits,
wherein the data field includes a link report signal including link quality information between the first AP and the STA and link quality information between the second AP and the STA; and
selecting, by the sharing AP, the first AP as a shared AP based on first and second capability information and the link quality information.
2. The method of claim 1, further comprising:
transmitting, by the sharing AP, an announce frame to the first AP,
wherein the announce frame includes information that the first AP is selected as a shared AP.
3. The method of claim 1,
wherein the BSS information of the first AP includes at least one of BSS identifier (ID) of the first AP, IDs of STAs belonging to the BSS of the first AP, capability information of STAs belonging to the BSS of the first AP, STA ID that can participate in sounding for multi-AP transmission, a buffer state of the BSS of the first AP, information related to a multiple input multiple output (MIMO) capability of the first AP.
4. The method of claim 1,
wherein the link quality information includes at least one of a received signal strength indicator (RSSI), a signal to noise ratio (SNR), a signal to interference plus noise ratio (SINR), channel state information (CSI), and channel quality indicator (CQI) measured by the STA based on signals received from the first and second APs,
wherein the link report signal further includes priority information for the shared AP, and
wherein the priority information is information on an order of the first and second APs determined based on the link quality information.
5. The method of claim 1, further comprising:
receiving, by the sharing AP, first capability information from the first AP and second capability information from the second AP,
wherein the first capability information includes information related to multi-AP transmission capability of the first AP, and wherein the second capability information includes information related to multi-AP transmission capability of the second AP.
6. The method of claim 5,
wherein the first capability information includes information on at least one multi-AP transmission method, supported by the first AP, among joint transmission, coordinated beam forming, coordinated orthogonal frequency division multiplexing access (OFDMA), and coordinated spatial reuse.
7. A sharing access point (AP) in a wireless local area network system, the AP comprises,
a transceiver for transmitting and receiving a radio signal; and
a processor coupled to the transceiver, wherein the processor is configured to:
receive, by the sharing AP from a first AP, basic service set (BSS) information of the first AP;
receive, by the sharing AP from a second AP, BSS information of the second AP;
receive, by the sharing AP from a station (STA), a physical protocol data unit (PPDU) comprising a legacy signal (L-SIG) field, a repeated legacy signal (RL-SIG) field which is a repeat of the L-SIG field, a control signal field carrying information for interpreting the PPDU, and a data field,
wherein the RL-SIG field is contiguous to the L-SIG field, and the control signal field is contiguous to the RL-SIG field,
wherein the L-SIG field includes a length field which is set to a value satisfying a condition that a remainder is zero when the length field is divided by three (3),
wherein the control signal field includes a subfield related to a physical version of the PPDU and having a length of three bits,
wherein the data field includes a link report signal including link quality information between the first AP and the STA and link quality information between the second AP and the STA; and
select, by the sharing AP, the first AP as a shared AP based on first and second capability information and the link quality information.
8. The sharing AP of claim 7, wherein the processor is further configured to:
transmit, by the sharing AP, an announce frame to the first AP, wherein the announce frame includes information that the first AP is selected as a shared AP.
9. The sharing AP of claim 7,
wherein the BSS information of the first AP includes at least one of BSS identifier (ID) of the first AP, IDs of STAs belonging to the BSS of the first AP, capability information of STAs belonging to the BSS of the first AP, STA ID that can participate in sounding for multi-AP transmission, a buffer state of the BSS of the first AP, information related to a multiple input multiple output (MIMO) capability of the first AP.
10. The sharing AP of claim 7,
wherein the link quality information includes at least one of a received signal strength indicator (RSSI), a signal to noise ratio (SNR), a signal to interference plus noise ratio (SINR), channel state information (CSI), and channel quality indicator (CQI) measured by the STA based on signals received from the first and second APs,
wherein the link report signal further includes priority information for the shared AP, and wherein the priority information is information on an order of the first and second APs determined based on the link quality information.

11. The sharing AP of claim 7, wherein the processor is further configured to:
receive, by the sharing AP, first capability information from the first AP and second capability information from the second AP,
wherein the first capability information includes information related to multi-AP transmission capability of the first AP, and
wherein the second capability information includes information related to multi-AP transmission capability of the second AP.

12. The sharing AP of claim 11,
wherein the first capability information includes information on at least one multi-AP transmission method, supported by the first AP, among joint transmission, coordinated beam forming, coordinated orthogonal frequency division multiplexing access (OFDMA), and coordinated spatial reuse.

* * * * *